United States Patent
Iino et al.

(10) Patent No.: US 7,088,551 B2
(45) Date of Patent: Aug. 8, 2006

(54) RECORDING MEDIA CARTRIDGE HAVING A LOCKING MEMBER FOR BODY HALVES

(75) Inventors: Wataru Iino, Kanagawa (JP); Kazuo Hiraguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 464 days.

(21) Appl. No.: 10/125,418

(22) Filed: Apr. 19, 2002

(65) Prior Publication Data

US 2002/0153441 A1 Oct. 24, 2002

(30) Foreign Application Priority Data

| Apr. 19, 2001 | (JP) | 2001-120779 |
| Jul. 12, 2001 | (JP) | 2001-211871 |
| Aug. 29, 2001 | (JP) | 2001-259367 |
| Sep. 27, 2001 | (JP) | 2001-297739 |

(51) Int. Cl.
G11B 23/087 (2006.01)

(52) U.S. Cl. .................................................. 360/132
(58) Field of Classification Search .................. 360/133, 360/132; 242/347; 369/271
See application file for complete search history.

(56) References Cited

U.S. PATENT DOCUMENTS

| 4,371,286 A | * | 2/1983 | Okamura et al. ........... 403/375 |
| 4,566,653 A | | 1/1986 | Bettinger et al. |
| 5,440,439 A | * | 8/1995 | Rambosek et al. ......... 360/132 |
| 5,730,382 A | * | 3/1998 | Kaneda et al. .............. 242/347 |
| 6,043,962 A | * | 3/2000 | Abe et al. ................... 360/132 |

FOREIGN PATENT DOCUMENTS

| DE | 82 29 387.2 U1 | 6/1983 |
| DE | 37 87 879 T2 | 2/1994 |
| DE | 43 34 926 A1 | 4/1995 |
| EP | 0 271 997 B1 | 6/1988 |
| EP | 0 761 986 B1 | 9/1994 |
| GB | 2 210 352 A | 6/1989 |
| GB | 2 210 353 A | 6/1989 |
| JP | 7-29348 A | 1/1995 |

* cited by examiner

Primary Examiner—Jefferson Evans
(74) Attorney, Agent, or Firm—Sughrue Mion, PLLC

(57) ABSTRACT

The recording media cartridge includes a case body formed from an upper half and a lower half, a recording medium which is rotatably accommodated in the case body, an upper engagement portion arranged in the upper half, a lower engagement portion arranged in the lower half in correspondence with the upper engagement portion and a locking member which engages the upper engagement portion with the lower engagement portion. The lower engagement portion and the upper engagement portion are engaged with each other by the locking member whereby the upper half and the lower half are coupled with each other.

13 Claims, 10 Drawing Sheets

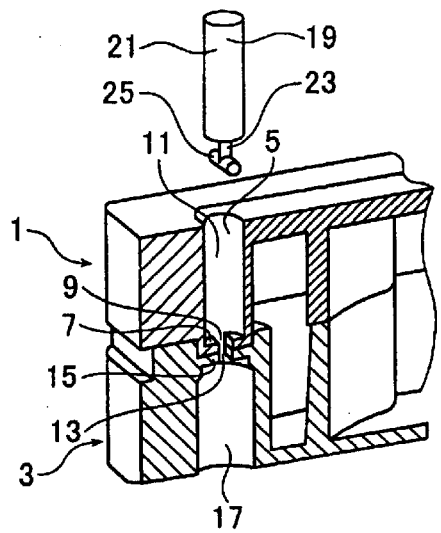
FIG. 1A
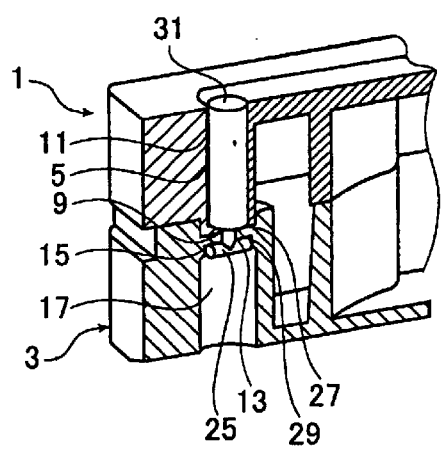
FIG. 1B
FIG. 2A  FIG. 2B  FIG. 2C
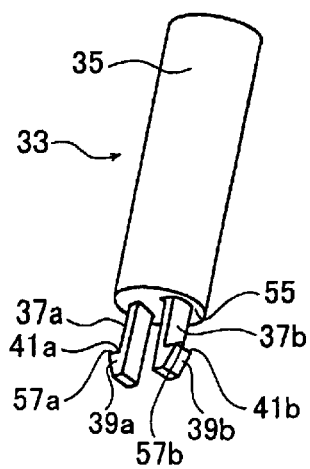
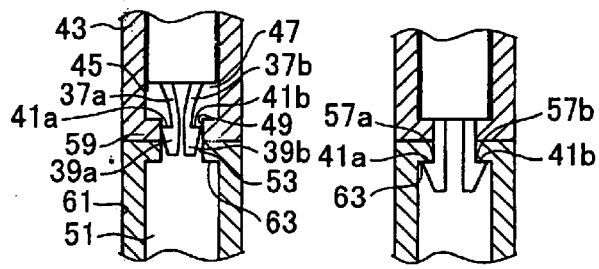

RECORDING MEDIA CARTRIDGE HAVING A LOCKING MEMBER FOR BODY HALVES

BACKGROUND OF THE INVENTION

1. Field of the Invention

The present invention relates to a recording media cartridge such as a magnetic tape cartridge or cassette typified by a digital video cartridge (DVC), and more particularly to a recording media cartridge for reducing a burden on the environment.

More specifically, the present invention relates to a fastening structure by which a case body (cassette case) is fastened by coupling an upper half of the case body with a lower half in a recording media cartridge such as a magnetic tape cassette or cartridge. More particularly, the present invention relates to a fastening structure of a case body in a recording media cartridge which enables easy separation of an upper half from a lower half when various components constituting the recording media cartridge scraped after use are disassembled and sorted for every kind of material to be recycled as new material.

2. Description of the Related Art

A magnetic tape cartridge or cassette (hereinafter typically referred to as a magnetic tape cartridge) of a so-called two-reel type in which a pair of takeup hubs (tape reels) around which a magnetic tape as a recording medium is wound is accommodated rotatably in a case body (cartridge body, case body or cassette case) formed by an upper half and a lower half, or a magnetic tape cartridge or cassette of a so-called one-reel type in which a single tape reel around which a magnetic tape is wound is accommodated rotatably in the case body mentioned above is conventionally known as a recording/reproducing tape cartridge or cassette used in a video tape recorder or a video camera for personal use or office use or a large capacity recording medium for data backup in an external storage apparatus such as a computer. A large capacity recording medium such as a magnetic or magneto-optical disc cartridge which uses a magnetic or magneto-optical disc for the recording medium is also well known.

Recording media cartridges such as a magnetic or magneto-optical disk cartridge, a magnetic tape cartridge and a magnetic tape cassette referred to above are used for data storage in a computer etc. to retain important information recorded therein, so that various protection mechanisms are added thereto for preventing a damage of a magnetic or magneto-optical disk, or a jamming of a magnetic tape or inadvertent draw-out thereof.

A magnetic tape cartridge of two-reel type will now be described in detail.

FIG. 24 is an exploded perspective view showing a structure of the above-mentioned DVC (digital video cartridge) which is an exemplary magnetic tape cartridge. As shown in FIG. 24, the magnetic tape cartridge for use as the DVC (hereinafter simply referred to as cartridge) is adapted to perform recording and reproduction while a magnetic tape 426 wound around a pair of tape reels 424 is held movably in a case body 410. The case body 410 is constituted by assembling an upper half 420 and a lower half 422 each having a bottom plate and a peripheral wall in a capped manner and fastening with screws (five screws 412 in the illustrated case). A pair of tape reels 424 on the supply side and take-up side are accommodated rotatably in the case body 410 in the state in which the magnetic tape 426 is wound around the tape reels 424. A lid (front cover) 430 which can be opened or closed freely is also mounted on the upper half 420 to cover a front surface of the case body 410 and to protect the front portion from dust.

A plurality of regulating ribs are erected on the bottom plate 422a of the lower half 422 in such a way that they comply with the outer peripheries of the tape reels 424, 424 and by these ribs, the tape reels 424, 424 are prevented from being displaced in a direction parallel to their planes. An opening is made in the bottom plate of the upper half 420 such that the user can confirm the amount by which the magnetic tape 426 has been would onto the tape reels 424, 424 and a transparent window (inspection window) 420a is provided to cover the opening.

Provided on the inner surface (the underside in the drawing) are a pair of reel urging leaf springs (reel holding springs) 438, 438 which correspond to the respective tape reels 424, 424. The reel holding springs 438, 438 are each cantilevered to the inner surface of the upper half 420 by means of ultrasonic welding, thermal welding or the like so that the corresponding tape reels 424, 424 are urged toward the lower half 422.

Mounted at the front face of the upper half 420 (its left side in the drawing) is a lid (front cover) 430 that covers and protects the magnetic tape 426 when the cartridge is not in service. As will be described later, the lid 430 comprises of three members, an outer lid 432, an upper lid 433, and an inner lid 434, and each of which is mounted in such a way that an opening portion 428 in the magnetic tape cartridge can be opened or closed as required.

Two tape guides 446, 446 are provided on two extensions 440, 440 on opposite sides of the opening portion 428 made at the front end of the lower half 422 (closer to the viewer of the drawing). The magnetic tape 426 being delivered from one tape reel 424 and taken up by the other tape reel 424 is guided by each tape guide 446 so that it passes by a predetermined position in the opening portion 428.

The lower half 422 has a tape reel locking member (hereunder simply referred to as a reel locking member) 436 mounted at its rear end (farther away from the viewer of the drawing). The reel locking member 436 has a tape reel lock (engaging and fastening) arm 436a and a slider body 436b which is slidably pinched by a pair of guide ribs erected on the bottom plate 422a of the lower half 422. The reel locking member 436 is urged by a compressive coil spring 442 so that the tape reel lock arm 436a is engaged with each of engagement wheels 424a, 424a formed on the outer peripheries of the lower flanges of the tape reels 424, 424, thereby preventing accidental rotation of the tape reels 424, 424. As a result, troubles with the magnetic tape 426 such as failure to be wound up tightly enough can be prevented.

While the outer lid 432, the upper lid 433 and the inner lid 434 of the lid 430 are mounted on the upper half 420 as described above, the outer lid 432 has a flat plate portion and two side plates, with locking pins 448 projecting inside of the side plates. To sidewall portion 422c that are parts of the peripheral wall of the lower half 422, lid locking members 444, 444 are mounted pivotally such that they lock the locking pins 448 on the outer lid 432 when it is in a closed state. A lid locking spring 450 is similarly mounted on the lower half 422 to urge the lid locking members 444, 444 in the direction of locking the aforementioned locking pins 448.

An anti-erasure plug 452 is mounted on the lower half 422 to circumvent erroneous erasing of the data recorded on the magnetic tape 426. The anti-erasure plug 452 has a pawl projecting on one of its two lateral sides (farther away from the viewer of the drawing) so that when the plug is mounted in the lower half 422, the pawl will become exposed to the outside through the opening made in the peripheral wall of the upper half 420.

By manipulating the pawl from the outside, the user can move the anti-erasure plug 452 along the guide ribs erected on the bottom plate 422a of the lower half 422. The moving bottom of this anti-erasure plug 452 closes or opens the detection hole in the bottom plate of the lower half 422 and an apparatus such as a recorder reads the state of this detection hole to determine whether new data can be written to the magnetic tape 426.

The lower half 422 has a rectangular bottom plate 422a. A pair of tape reels 424, 424 around which the magnetic tape 426 is wound are rotatably supported on this bottom plate 422a. There are provided reel spindle insertion holes 422b for, when the cartridge is loaded in a recording/reproducing apparatus, inserting reel spindles (not shown) into the above-described tape reels 424, 424 from the recording/reproducing apparatus for rotating and driving the tape reels 424, 424.

Furthermore, the above-mentioned bottom plate 422a has two extensions 440, 440 extending frontward from the both ends thereof, and on which two cylindrical tape guides 446, 446 are erected at right angle with the bottom plate 422a for guiding the magnetic tape 426 tensioned between the aforementioned pair of tape reels 424, 424 and passing through a predetermined rout into the front surface of the cassette case. The space between the two extensions 440 where the bottom plate 422a of the lower half 422 is cut out, forming the opening portion 428 in the above-mentioned cassette case.

Parts including the mentioned upper and lower halves 420 and 422, the outer lid 432, the upper lid 433 and the inner lid 434 of the lid 430, and the upper and lower flanges of the tape reels 424, 424 are respectively formed by injection molding. And other parts that are formed by injection molding are employed to the cartridge as appropriate.

By the way, recently, as a concern to the environmental issue has been increased, the attention is paid increasingly to the adverse effect on the environment of the increase of various kinds of waste materials such as plastics or composite materials. It becomes important to reduce the burden on the environment, i.e., to reduce the waste materials, or to produce no factors causing air, water or soil pollution even if wasted so that the environmental conservation cannot be hindered. For this reason, industrial products must have a structure enabling incorporation in a recycling system, and a structure is desired which may be suited for the recycling system for the whole society. In view of this, it becomes also necessary to manufacture a recording media cartridge such as a magnetic tape cartridge taking into consideration the structure or material therefor.

However, in the magnetic tape cartridge as mentioned above, the upper half and the lower half constituting the case body are conventionally coupled with each other by metal screws, and a magnetic tape made of a different material than that of the case body is accommodated in the case body in a state in which the tape is wound around a reel also made of a different material than that of the case body.

As mentioned above, components of the conventional magnetic tape cartridge or other recording media cartridges are made of various kinds of materials such as synthetic resin, metal, composite material of metal and synthetic resin and other material. Accordingly, it is difficult to dismount (sort) the materials for every kind of material. Also, even if the used recording media cartridge may be dismounted, it is difficult to separate and sort the materials for every kind of the material and to recycle the material. This would be a cause of generating a large amount of waste resin material. The waste resin material causes the environmental burden.

For instance, in the magnetic tape cartridge shown in FIG. 24, the case body 410 is constituted by fastening the upper half 420 and the lower half 422 by five metal screws 412. Accordingly, upon disassembling, troublesome work such as removal of the screws is required. Labor and cost are needed therefor. This is one of causes to prevent the separation of the materials for every kind of material for sorting and collecting, and recycling.

In other words, in the prior art magnetic tape cartridge as mentioned above, the case body for accommodating a pair of tape reels around which a long magnetic tape is wound is usually tightly fastened with five self-tapping screws so as to prevent loosening, which makes it difficult to disassemble the cassette case. In particular, a rusty screw often cannot be removed because the driver grooves in the head of the screw are broken. Even if the screw can be removed, the thus removed screw is likely to be lost and there is a high possibility that the screw may be lost in various components sorted. Therefore, in order to recycle such plastic components for reuse, metal pieces must be sorted again.

SUMMARY OF THE INVENTION

The present invention has been made in view of the above-described defects, and an object of the present invention is to provide a recording media cartridge that may overcome such defects.

More specifically, a primary object of the present invention is to provide a recording media cartridge in which an upper half and a lower half may readily be coupled with each other without using metal members such as screws, a firm case body is formed while keeping tight coupling when the upper half is coupled with the lower half, it is easy to separate the upper half from the lower half upon disassembling the case body, and it is easy to sort, collect and recycle the resin material to effectively reduce the waste resin material.

A secondary object of the present invention is to provide a recording media cartridge which can be assembled with an efficiency as high as or higher than that of a recording media cartridge having the conventional structure even when screws are not used for assembling the upper and lower cases by coupling, while at the same time, causing no reduction in the strength and shape stability (no generation of twist or warpage) of the recording media cartridge and of which the basic performance cannot be adversely affected by the changes in the assembling structure or method as mentioned above.

A tertiary object of the present invention is to provide a recording media cartridge which enables easy disassembly of the recording media cartridge scraped after use and which has a fastening structure of a case body which excludes the necessity of re-sorting metal pieces taking into consideration the incorporation of metal pieces even when the case body is disassembled, sorted for every kind of material and recycled for use as new material for every kind of material.

Other objects of the invention will become more apparent from the following description.

The inventors have found that various measures are taken for the recording media cartridge such as the magnetic tape cassette having the above-mentioned structure, when considering reduction of the waste material as mentioned above, in other words, reduction of the burden on the environment. An exemplary structure of the recording media cartridge is now proposed in which the case body can have a satisfactory strength even when the upper half is coupled with the lower half without using screws.

The inventors have attained the present invention taking into consideration that their proposed magnetic tape cartridge must be assembled with an efficiency as high as or higher than that of a recording media cartridge having the conventional structure, while at the same time causing no reduction in the strength and shape stability (no generation of twist or warpage), and what is the most important, the basic performance of the magnetic cartridge cannot be adversely affected by the changes in the assembling structure and method.

In order to attain the first object described above, the first aspect of the present invention provides a recording media cartridge comprising: a case body formed from an upper half and a lower half; a recording medium which is rotatably accommodated in the case body; an upper engagement portion arranged in the upper half; a lower engagement portion arranged in the lower half in correspondence with the upper engagement portion; and a locking member which engages the upper engagement portion with the lower engagement portion, wherein the lower engagement portion and the upper engagement portion are engaged with each other by the locking member whereby the upper half and the lower half are coupled with each other.

Preferably, the upper engagement portion has an engagement hole formed in the upper half in a vertical direction and a fitting hole formed in a bottom surface of the engagement hole; the lower engagement portion has an insertion hole which is formed in an upper bottom wall and which communicates with the engagement hole; the locking member passes through the engagement hole and the fitting hole of the upper engagement portion and the insertion hole of the lower engagement portion; and a tip end locking portion of the locking member is locked on an inner surface of the upper bottom wall of the lower engagement portion.

Preferably, the upper engagement portion has an engagement end which projects from a bottom surface of the upper half toward the lower half and which is provided with the locking member; the lower engagement portion is arranged in the lower half and has an engagement hole into which the engagement end of the upper engagement portion is fitted; and the engagement end of the upper engagement portion is fitted into the engagement hole of the lower engagement portion and locked therein.

Preferably, the upper engagement portion has a locking groove formed in the upper half; the lower engagement portion has a lower locking groove formed in a side wall of the lower half; the locking member has a substantially U-shaped cross section and includes an upper locking pawl portion and a lower locking pawl portion provided at each end of a bridge portion; and the upper locking pawl-portion of the locking member is engaged with the upper engagement portion and the lower locking pawl portion thereof is engaged with the lower engagement portion.

In order to attain the second object described above, the second aspect of the present invention provides a recording media cartridge for accommodating a recording medium in a case body formed by coupling an upper half with a lower half in a capped manner, wherein a combined lock means for the upper and lower halves at least in two directions perpendicular to each other along side walls of the upper and lower halves is provided in a corner portion of the case body.

Preferably, the combined lock means is formed in the corner portion which is a free or open end of the case body.

Preferably, the combined lock means is integrally formed using a slide core when the upper half or the lower half is formed.

The combined lock means has preferably a three-dimensional locking function not only in the two perpendicular directions along the side walls of the upper and lower halves but also in a direction perpendicular to these two directions, that is, direction vertically passing through the upper and lower halves.

The combined lock means may be the one divided into two or more portions. This case has the effect of readily forming the upper or lower half.

In order to attain the third object described above, the third aspect of the present invention provides a recording media cartridge for rotatably accommodating a recording medium in a case body formed from an upper half and a lower half, wherein the case body has a fastening structure comprising: a fastening member including a flange portion on one surface of which an engagement portion to be engaged with a rotary tool is provided and on a lateral surface of which a plurality of first guide grooves are provided, and a plurality of locking pieces which project from a surface opposed to the surface on which the engagement portion is located; a first coupling boss provided on one of the upper half and the lower half and including guide ways with which the first guide grooves provided on the lateral surface of the flange portion of the fastening member are engaged so that the fastening member can be guided without rotation, and each of which includes a cutout larger than a thickness of the flange portion of the fastening member and provided at an end to which the fastening member is inserted; and a second coupling boss which is provided on another one of the upper half and the lower half and in which release grooves for passing the plurality of locking pieces of the fastening member therethrough are located midway between the respective adjacent guide ways of the first coupling boss.

Preferably, the first coupling boss further includes second guide grooves through which the plurality of locking pieces of the fastening member pass, respectively; the second coupling boss further includes third guide grooves through which the plurality of locking pieces of the fastening member pass, respectively, and locking surfaces which are located on an extension of the third guide grooves and are engaged with the locking pawls of the locking pieces of the fastening member to lock the fastening member thereon; and the release grooves are located midway between the respective adjacent third guide grooves and unlock the locking pawls.

Preferably, the locking surfaces of the second coupling boss are recesses for locking the locking pawls of the fastening member provided on the extension of the third guide grooves; and the release grooves are located midway between the respective adjacent third guide grooves.

Preferably, the plurality of locking pieces are four locking pieces arranged at an interval of 90 degrees; the guide ways and the second guide grooves are offset by an angle of 45 degrees; and the second guide grooves are aligned with the third guide grooves.

Preferably, the engagement portion which is engaged with the rotary tool is a driver groove.

It should be noted here that the terms "upper" and "lower" in the recording media cartridge of each aspect of the present invention refer to the sides on which the upper half and the lower half are located, respectively.

The recording media cartridge according to each aspect of the present invention is not limited in any particular way as far as the cartridge has a case body having an upper half coupled with a lower half. Examples include a magnetic tape cartridge or cassette of which the structure and dimensional data are defined in JIS X6127, X6129, X6130 or ECMA-288, and other magnetic tape cartridges or cassettes including the one having another member such as a slider in the lower portion of the lower half. The reel type of the magnetic tape cartridge or cassette also is not particularly limited and one-reel type or two-reel type may be used.

The recording media cartridge of the present invention may be a magnetic or magneto-optical disc cartridge which uses a magnetic or magneto-optical disc for the recording media.

The "case body" in the recording media cartridge according to each aspect of the present invention comprises an upper half and a lower half as the principle components and further includes other members mounted on the upper half or lower half, a magnetic or magneto-optical disc, a tape reel around which a magnetic tape is wound, and a member mounted on the upper half or lower half for retaining or accommodating part of the magnetic tape drawn from the tape reel or the like. For example, the two-reel type magnetic tape cartridge shown in FIG. 24 includes a plurality of other members such as lids (outer lid, upper lid and inner lid) mounted on the upper half and is formed by combining the upper half with the lower half.

BRIEF DESCRIPTION OF THE DRAWINGS

In the accompanying drawings:

FIG. 1A is an enlarged schematic diagram illustrating a structural example of an engagement of an upper half with a lower half in a magnetic tape cartridge according to an embodiment of the present invention;

FIG. 1B is an enlarged schematic cross-sectional view showing the engagement condition;

FIG. 2A is a perspective view showing a structural example of another locking member according to the present invention;

FIG. 2B is an enlarged schematic cross-sectional view illustrating the engagement of the upper half with the lower half by the locking member;

FIG. 2C is an enlarged schematic cross-sectional view illustrating the engagement condition;

DESCRIPTION OF THE PREFERRED EMBODIMENTS

Figure 3A:
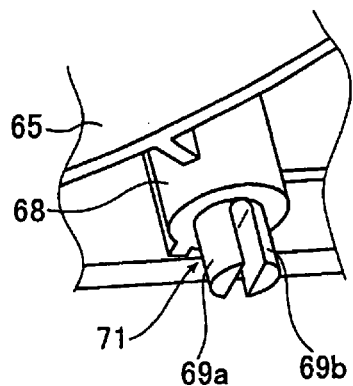
FIG. 3A is an enlarged schematic view illustrating another structural example of the engagement of the upper half with the lower half according to the present invention.

The recording media cartridge of the present invention will now be described in detail with reference to the preferred embodiments shown in the accompanying drawings.

A recording media cartridge according to a first aspect of the present invention will now be described.

In the recording media cartridge according to the first aspect of the present invention, an upper engagement portion arranged in an upper half and a lower engagement portion arranged in a lower half in correspondence with the upper engagement portion are engaged with each other by a locking member whereby the upper half and the lower half are coupled with each other. The following three structures (A), (B) and (C) are used for coupling the upper half with the lower half.

(A) A structure in which an upper engagement portion including an engagement hole formed in an upper half in a vertical direction and a fitting hole formed in a bottom surface of the engagement hole, and a lower engagement portion arranged in a lower half in correspondence with the upper engagement portion are provided; an insertion hole communicating with the engagement hole is formed in an upper bottom wall of the lower engagement portion; and a tip end locking portion of a locking member passing through the engagement hole and the fitting hole of the upper engagement portion and the insertion hole of the lower engagement portion is locked on an inner surface of the upper bottom wall of the lower engagement portion.

In the recording media cartridge having the structure (A), the locking member may be either of the following members:

(A-1) the member which has a body and a laterally columnar locking end provided at a lower end of the body through a rotary shaft portion; and (A-2) the member which has locking pawl end portions projecting toward the outer circumference at tip ends of rotary shafts formed at the lower end of the body. The locking pawl end portions are arranged in an opposing position about the axis of the body and each have a pawl-shaped tip projecting outward.

The engagement hole and the fitting hole each have a cross section in accordance with the locking end or locking pawl end portions, through which the locking end or the locking pawl end portions pass.

In this structure (A), the vertical length ($L_1$) of the body of the locking member (A-1) is set to be equal to or smaller than the depth ($D_5$) of the engagement hole of the upper engagement portion ($D_5 \geqq L_1$) and the outer diameter ($R_1$) of the body is set to be substantially the same as the inner diameter ($r_5$) of the engagement hole. Also, the outer diameter ($R_2$) of the rotary shaft portion is set to be equal to or smaller than the width W in the transverse direction perpendicular to the axial direction of the fitting hole and the insertion hole ($R_2 \leqq W$). The length ($L_2$) of the rotary shaft portion, i.e., the distance ($D_{2-9}$) between a lower end face of the body and a side wall upper portion of the locking end is set to be substantially the same as the sum ($t_7+t_{15}$) of the thickness ($t_7$) of a lower bottom wall of the engagement hole in the upper engagement portion of the upper half and the thickness ($t_{15}$) of an upper bottom wall in the lower engagement portion of the lower half ($L_2$, $D_{2-9} \equiv (t_7+t_{15})$).

When coupling the upper half and the lower half having such a structure by using the locking member (A-1), the upper half and the lower half are overlapped in a capped manner so that the upper engagement portion and the lower engagement portion are arranged on the upper side and lower side, respectively. Thereafter, the locking end of the locking member is inserted from the side of the upper half into the lower engagement portion first through the engagement hole of the upper engagement portion, then through the fitting hole of the upper engagement portion and the insertion hole of the lower engagement portion. Subsequently, the locking member is rotated to move the locking end with respect to the fitting hole and the insertion hole and the upper end of the locking end is engaged with the upper bottom wall of the lower engagement portion whereby the upper half can be engaged with the lower half.

At this time, screw grooves such as +, − and star shapes provided in a head portion of the locking member advantageously facilitate the rotation of the locking end and the engagement of the locking end with the upper bottom wall of the lower engagement portion by the rotation of the locking member in the axial direction. Since the length ($L_2$) of the rotary shaft portion, i.e., the distance ($D_{7-9}$) between the lower end face of the body and the side wall upper portion of the locking end is set to be substantially the same as the sum ($t_7+t_{15}$) of the thickness ($t_7$) of a lower bottom wall of the engagement hole in the upper engagement portion of the upper half and the thickness ($t_{15}$) of an upper bottom wall in the lower engagement portion of the lower half ($L_2$, $D_{7-9} \equiv (t_7+t_{15})$) the tight engagement is attained.

Also, when the upper half and the lower half having the structure in which they are coupled with each other by using the locking member (A-1) are disassembled, the locking member is rotated so that the longitudinal direction of the engagement end can coincide with the longitudinal direction of the cross sections of the fitting hole and the insertion hole and thereafter, the locking member is removed upwardly through the engagement hole so that the engagement between the upper half and the lower half may be released.

When coupling the upper half with the lower half using the locking member (A-2), the upper half and the lower half are overlapped in a capped manner so that the upper engagement portion and the lower engagement portion are arranged on the upper side and lower side, respectively. Thereafter, the locking pawl end portions of the locking member are inserted from the side of the upper half into the lower engagement portion first through the engagement hole of the upper engagement portion, then through the fitting hole of the upper engagement portion and the insertion hole of the lower engagement portion. The locking pawl end portions pass through the fitting hole and the insertion hole while their tip ends brought into contact with the inner surfaces of the fitting hole and the insertion hole are pressed inside, whereby the rotary shafts are deformed inwardly. The locking pawl end portions that have passed through the insertion hole are released from the contact with the inner wall of the insertion hole, and the elastic deformation of the rotary shafts within the lower engagement portion is eliminated. Thus, the upper locking surfaces of the tip ends come in contact with and locked on the inner surface of the upper bottom wall of the lower engagement portion whereby the upper half is engaged with the lower half.

Since the length ($L_3$) of the rotary shafts and, i.e., the distance ($D_5$) between the lower end face of the body and the upper locking surfaces of the tip ends of the locking pawl end portions in the locking member (A-2) is set to be substantially the same as the sum ($t_9+t_6$) of the thickness ($t_9$) of the lower bottom wall in the upper engagement portion of the upper half and the thickness ($t_6$) of an upper bottom wall in the lower engagement portion of the lower half ($L_3$, $D_5 \equiv (t_9+t_6)$), the tight engagement is attained.

Also, when the upper half and the lower half coupled with each other by using the locking member (A-2) are to be disassembled, a jig is inserted from below the lower engagement portion, the tip ends of the engagement pawl end portions are pressed inside toward the axis center, the rotary shafts are elastically deformed inwardly and the engagement pawl end portions are pushed up into the upper engagement portion through the insertion hole and the fitting hole. Thereafter, the locking member is pulled upwardly so that the engagement between the upper half and the lower half may be released.

(B) A structure in which an upper engagement portion having an engagement end which projects from a bottom surface of an upper half toward a lower half and a lower engagement portion which is arranged in the lower half and which has an engagement hole into which the engagement end is fitted, and the engagement end of the upper engagement portion is fitted into the engagement hole of the lower engagement portion and locked therein.

In the recording media cartridge having the structure (B), the upper half has the upper engagement portion with split cylindrical locking members projecting from a bottom surface of a rib implanted in the inner surface of its upper plate, and the lower half has the lower engagement portion defined by the engagement hole into which the lower end of the rib is fitted and a fitting hole formed in a bottom surface of the engagement hole into which the locking members are fitted.

When coupling the upper half and the lower half having the structure (B), the upper half and the lower half are overlapped in a capped manner, the locking members of the upper engagement portion are inserted into the fitting hole and the lower end of the rib is fitted in the engagement hole. At this time, since the inner diameter ($r_7$) of the fitting hole is formed to be smaller than the outer diameter ($R_9$) of the locking members ($r_7 < R_9$), the locking members are pushed inwardly upon fitting into the engagement hole and are brought into intimate engagement with the engagement hole. Thus, the upper half and the lower half are coupled together.

Also, when the upper half and the lower half coupled with each other by the structure (B) are to be disassembled, a jig is inserted from below the lower engagement portion and the locking members are pushed up toward the upper half and pulled out from the engagement hole so that the engagement between the upper half and the lower half may be released.

(C) A structure in which an upper engagement portion having a locking groove formed in an upper half and a lower engagement portion having a lower locking groove formed in a side wall of a lower half are provided, a locking member which has a substantially U-shaped cross section and which has an upper locking pawl portion and a lower locking pawl portion at each end of a bridge portion is provided, and the upper locking pawl portion of the locking member is engaged with the upper engagement portion and the lower locking pawl portion thereof is engaged with the lower engagement portion.

In the recording media cartridge having the structure (C), the upper engagement portion having an upper locking recess portion formed at an upper surface end portion of the upper half and an upper engagement groove formed over a side surface of the upper half from this upper locking recess portion is provided as well as the lower engagement portion having a lower locking recess portion formed in a side wall of the lower half and a lower engagement groove communicating with the upper engagement groove from this lower locking recess portion. Also, a locking member has at both ends of a bridge portion having a U-shaped cross section an upper locking pawl end portion and a lower locking pawl end portion which are engaged with the upper locking recess portion and lower locking recess portion, respectively.

When coupling the upper half and the lower half having the structure (C) with each other, the upper half is overlapped with the lower half in a capped manner, the upper locking pawl end portion and the lower locking pawl end portion of the locking member are engaged with the upper engagement recess portion of the upper half and the lower locking recess portion of the lower half, respectively so that the upper half and the lower half are engaged with each other. At this time, the bridge portion of the locking member is engaged with the upper engagement groove of the upper half and the lower engagement groove of the lower half.

When the upper half and the lower half coupled with each other by the structure (C) are to be disassembled, the engagement of the upper locking recess portion of the upper half with the upper locking pawl end portion of the locking member is released and at the same time, the engagement of the lower locking recess portion of the lower half with the lower locking pawl end portion of the locking member is released whereby the locking member is removed. The coupling between the upper half and the lower half can be thus released.

In the recording media cartridge according to the first aspect of the present invention, the upper half may be coupled with the lower half by one of the coupling structures (A), (B) and (C) as mentioned above or combination of these two or more structures. Alternatively, the upper half may be coupled with the lower half by other structures than the coupling structures (A), (B) and (C) as mentioned above. For example, the upper half may be coupled with the lower half by a structure in which a locking pawl projecting upward from the side wall of the lower half is engaged with a locking recess portion formed in the side wall of the upper half.

In the recording media cartridge of the present invention, the portions in which the upper half is coupled with the lower half are not particularly limited as far as the coupling does not prevent rotation or other operations of recording media such as a magnetic tape and a recording disc, or a medium holder in which the recording media are held. The upper half is coupled with the lower half in at least two portions according to the structure (A), (B) or (C) mentioned above. The locking member as well as the upper engagement portion and the lower engagement portion each corresponding to the locking member are provided in at least two portions of the case body which are opposed to each other. The upper half can be thus coupled with the lower half to form the case body. The upper and lower engagement portions may be provided, if necessary, in four corners or five or more portions of the case body. The recording media cartridge of the present invention may be formed by a combination of the coupling structures mentioned above or may have a composite structure in which the coupling structures mentioned above are combined with another coupling structure.

Figure 24:
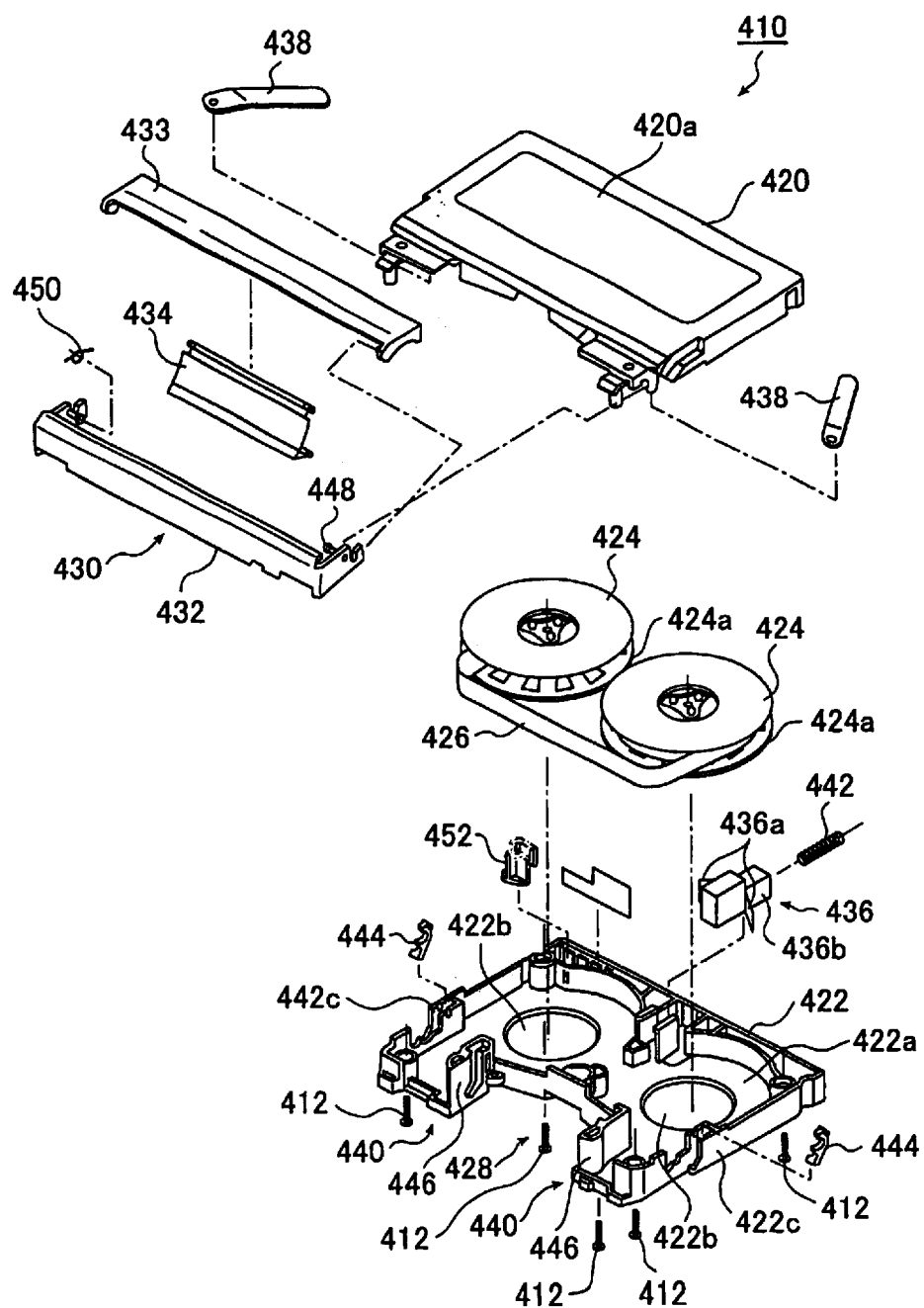
FIG. 24 is an exploded perspective view showing a structural example of a conventional magnetic tape cartridge for use as a DVC.

The recording media cartridge according to the first aspect of the present invention will now be described with reference to a structural example of a two-reel type magnetic tape cartridge shown in FIGS. 1A to 8. The magnetic tape cartridge will be described below as a typical example of the recording media cartridge of the present invention. However, the present invention is not limited thereto. Note that, in the following description, an upper half and a lower half as well as an engagement portion and a locking member therefor will be mainly described and members and parts constituting the magnetic tape cartridge except for a case body, for example, the case body, a front cover and other respective members and parts in the magnetic tape cartridge shown in FIG. 24 are not specially limited but members and parts used may be the same or different and are not shown in the drawings. The description thereof is also omitted.

FIG. 1A is a view illustrating a structural example for coupling an upper half 1 and a lower half 3 in an embodiment of the magnetic tape cartridge of the present invention.

The upper half 1 has an upper engagement portion 11 composed of an engagement hole 5 formed in a vertical direction thereof and a fitting hole 9 formed in a substantially rectangular shape in cross section corresponding to a cross-sectional shape of a locking end 25 of a locking member 19 in a diametric direction of the engagement hole 5 in a lower bottom wall 7 of the engagement hole 5. A lower engagement portion 17 is formed in a lower half 3 which has an upper bottom wall 15 in which an insertion hole 13 communicating with the fitting hole 9 of the upper engagement portion 11 and having the same cross-sectional shape as that of the fitting hole 9 is formed.

In a case body of the magnetic tape cartridge having the upper engagement portion 11 and the lower engagement portion 17, the locking member 19 shown in FIG. 1A is used and the upper half 1 and the lower half 3 are coupled with each other. The locking member 19 has a body 21 and a laterally columnar locking end 25 at a lower end of this body 21 through a rotary shaft portion 23.

In this locking member 19, the vertical length ($L_{21}$) of the body 21 is set to be equal to or smaller than the depth ($D_5$) of the engagement hole 5 of the upper engagement portion 11 ($D_5 \geq L_{21}$) and the outer diameter ($R_{21}$) of the body 21 is set to be substantially the same as the inner diameter ($r_5$) of the engagement hole 5. Also, the outer diameter ($R_{23}$) of the rotary shaft portion 23 is set to be equal to or smaller than the width $W_{9, 13}$ in a transverse direction perpendicular to an axial direction of the fitting hole 9 and the insertion hole 13 ($R_{23} \leq W_{9, 13}$). The length ($L_2$) of the rotary shaft portion 23, i.e., the distance ($D_{27-29}$) between a lower end face 27 of the body 21 and a side wall upper portion 29 of the locking end 25 is set to be substantially the same as the sum ($t_7+t_{15}$) of the thickness ($t_7$) of the lower bottom wall 7 of the engagement hole 5 in the upper engagement portion 11 of the upper half 1 and the thickness ($t_{15}$) of the upper bottom wall 15 in the lower engagement portion 17 of the lower half 3 ($L_2$, $D_{27-29} \equiv (t_7+t_{15})$).

When coupling the upper half 1 and the lower half 3 having such a structure, as shown in FIG. 1B, the upper half 1 and the lower half 3 are overlapped in a capped manner so that the upper engagement portion 11 and the lower engagement portion 17 are arranged on the upper side and lower side, respectively. Thereafter, the locking end 25 of the locking member 19 is inserted from the side of the upper half 1 into the lower engagement portion 17 first through the engagement hole 5 of the upper engagement portion 11, then through the fitting hole 9 of the upper engagement portion 11 and the insertion hole 13 of the lower engagement portion 17. Subsequently, the locking member 19 is rotated to move the locking end 25 with respect to the fitting hole 9 and the insertion hole 13 and the upper end of the locking end 25 is engaged with the upper bottom wall 15 of the lower engagement portion 17 whereby the upper half 1 can be engaged with the lower half 3.

At this time, screw grooves such as +, − and star shapes provided in a head portion 31 of the locking member 19 advantageously facilitate the rotation of the locking end 25 and the engagement of the locking end 25 with the upper bottom wall 15 of the lower engagement portion 17 by the rotation of the locking member 19 in the axial direction. Since the length ($L_2$) of the rotary shaft portion 23, i.e., the distance ($D_{27-29}$) between the lower end face 27 of the body 21 and the side wall upper portion 29 of the locking end 25 is set to be substantially the same as the sum ($t_7+t_{15}$) of the thickness ($t_7$) of the lower bottom wall 7 of the engagement hole 5 in the upper engagement portion 11 of the upper half 1 and the thickness ($t_{15}$) of the upper bottom wall 15 in the lower engagement portion 17 of the lower half 3 ($L_2$, $D_{27-29} \equiv (t_7+t_{15})$), the tight engagement is attained.

Also, when the upper half 1 and the lower half 3 are disassembled, the locking member 19 is rotated, the longitudinal direction of the engagement end 25 can coincide with the longitudinal direction of the cross sections of the fitting hole 9 and the insertion hole 13 and thereafter, the locking member 19 is removed upwardly through the engagement hole 5 so that the engagement between the upper half 1 and the lower half 3 may be released.

Also, FIGS. 2A, 2B and 2C show a structural example for coupling the upper half and the lower half by using another locking member 33.

This locking member 33 has locking pawl end portions 39a and 39b projecting toward the outer circumference at tip ends of rotary shafts 37a and 37b formed at the lower end of the body 35. The locking pawl end portions 39a and 39b are arranged at a position facing each other about an axis of the body 35 and have tip ends 41a and 41b projecting in hook pawl shapes toward the outside, respectively.

In this locking member 33, the length ($L_{35}$) of the body 35 in the vertical direction is set to be equal to or smaller than the depth ($D_{47}$) of the engagement hole 47 of the upper engagement portion 45 formed in the upper half 43 ($D_{47} \geq L_{35}$), and the outer diameter ($R_{35}$) of the body 35 is set to be substantially the same as the inner diameter ($r_{47}$) of the engagement hole 47. The distance ($W_{37}$) between the outer side of the rotary shaft 37a and the outside of the rotary shaft 37b is equal to or smaller than the inner diameter ($r_{49, 53}$) of the fitting hole 49 of the upper engagement portion 45 and the insertion hole 53 of the lower engagement portion 51 ($W_{37} \leq r_{49, 53}$). The length ($L_{37}$) of the rotary shaft 37a and 37b, i.e., the distance ($D_{55-57}$) between the lower end face 55 of the body 35 and the upper locking surfaces 57a and 57b of the tip ends 41a and the 41b of the locking pawl end portions 39a and 39b is set to be substantially the same as the sum ($t_{59}+t_{63}$) of the thickness ($t_{59}$) of a lower bottom wall 59 in the upper engagement portion 45 of the upper half 43 and the thickness ($t_{63}$) of an upper bottom wall 63 in the lower engagement portion 51 of the lower half 61 ($L_{37}$, $D_{55-57} \equiv (t_{59}+t_{63})$).

When coupling the upper half 43 and the lower half 61 having such a structure, as shown in FIG. 2B, the upper half 43 and the lower half 61 are overlapped in a capped manner and the upper engagement portion 45 and the lower engagement portion 51 are arranged up and down. Thereafter, the locking pawl end portions 39a and 39b of the locking member 33 are inserted from the side of the upper half 43 into the lower engagement portion 51 first through the engagement hole 47 of the upper engagement portion 45, then through the fitting hole 49 of the upper engagement portion 45 and the insertion hole 53 of the lower engagement portion 51.

At this time, as shown in FIG. 2B, the locking pawl end portions 39a and 39b are inserted into the fitting hole 49 and the insertion hole 53 while the tip ends 41a and 41b being depressed in contact with the inner wall of the fitting hole 49 and the insertion hole 53 and the rotary shafts 37a and 37b being deformed inwardly. The locking pawl end portions 39a and 39b that have passed through the insertion hole 53 are released from contact with the inner wall of the insertion hole 53, the elastic deformation of the rotary shaft 37a and 37b within the lower engagement portion 51 is obviated and as shown in FIG. 2C, the upper locking surfaces 57a and 57b of the tip ends 41a and 41b are locked in contact with the upper bottom wall inner surface 63 of the lower engagement portion 62 to thereby engage the upper half 43 and the lower half 61 with each other.

Since the length ($L_{37}$) of the rotary shafts 37a and 37b, i.e., the distance ($D_{55-57}$) between the lower end face 55 of the body 35 and the upper locking surfaces 57a and 57b of the tip ends 41a and 41b of the locking pawl end portions 39a and 39b is set to be substantially the same as the sum ($t_{59}+t_{63}$) of the thickness ($t_{59}$) of the lower bottom wall 59 in the upper engagement portion 45 of the upper half 43 and the thickness ($t_{63}$) of the upper bottom wall 63 in the lower engagement portion 51 of the lower half 61 ($L_{37}$, $D_{55-57}$≡ ($t_{59}+t_{63}$)), the tight engagement is attained.

Also, when the upper half 43 and the lower half 61 are to be disassembled apart from each other, a jig is inserted from below the lower engagement portion 51, the tip ends 41a and 41b of the engagement pawl end portions 39a and 39b are pressed inside together toward the axis center, the rotary shafts 37a and 37b are elastically deformed inwardly and the engagement pawl end portions 39a and 39b are pushed up into the upper engagement portion 45 through the insertion hole 53 and the fitting hole 49. Thereafter, the locking member 33 is pulled upwardly so that the engagement between the upper half 43 and the lower half 61 may be released.

Figure 3B:
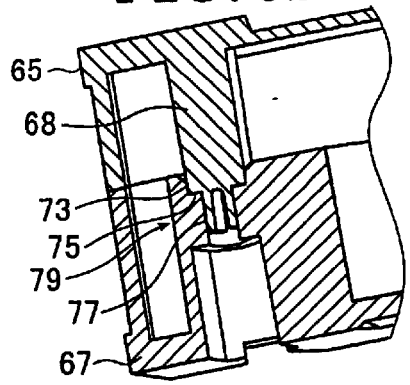
FIG. 3B is an enlarged schematic cross-sectional view showing the engagement condition.

FIGS. 3A and 3B show views illustrating another structural example for coupling the upper half 65 and the lower half 67.

In this structural example, as shown in FIG. 3A, the upper half 65 has an upper engagement portion 71 with split cylindrical locking members 69a and 69b projecting from a bottom surface of a rib 68 implanted in the inner surface of its upper plate, and as shown in FIG. 3B, the lower half 67 has a lower engagement portion 79 defined by an engagement hole 73 into which the lower end of the rib 68 is fitted and a fitting hole 77 formed in a bottom surface 75 of the engagement hole 73 into which the locking members 69a and 69b are fitted.

When coupling the upper half 65 and the lower half 67 having such a structure, as shown in FIG. 3B, the upper half 65 and the lower half 67 are overlapped in a capped manner, the locking members 69a and 69b of the upper engagement portion 71 are inserted into the fitting hole 77 and the lower end of the rib 68 is fitted in the engagement hole 73. At this time, since the inner diameter ($r_{77}$) of the fitting hole 77 is formed to be smaller than the outer diameter ($R_{69}$) of the locking members 69a and 69b ($r_{77}<R_{69}$), the locking members 69a and 69b are pushed inwardly upon fitting into the engagement hole 73 and are brought into intimate engagement with the engagement hole 73. Thus, the upper half 65 and the lower half 67 are coupled together.

Also, when the upper half 65 and the lower half 67 are to be disassembled apart from each other, a jig is inserted from below the lower engagement portion 79 and the locking members 69a and 69b are pushed up toward the upper half 65 and pulled out from the engagement hole 73 so that the engagement between the upper half 65 and the lower half 67 may be released.

Figure 4A:
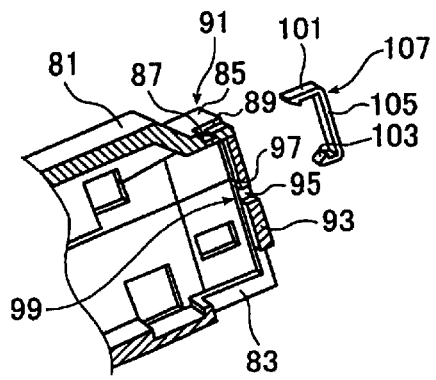
FIG. 4A is an enlarged schematic view illustrating a structural example of the engagement of the upper half with the lower half in a magnetic tape cartridge according to another embodiment of the present invention.
Figure 4B:
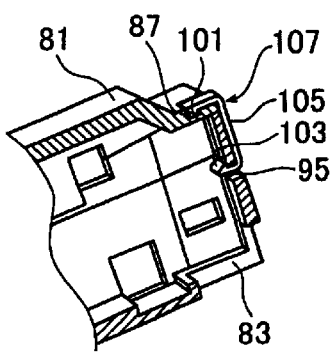
FIG. 4B is an enlarged schematic cross-sectional view showing the engagement condition.

FIGS. 4A and 4B show views illustrating another structural example for coupling the upper half 81 and the lower half 83.

In this structural example, an upper engagement portion 91 having an upper locking recess portion 87 formed at an upper surface end portion 85 of the upper half 81 and an upper engagement groove 89 formed over a side surface of the upper half 81 from this upper locking recess portion 87 is provided as well as a lower engagement portion 99 having a lower locking recess portion 95 formed in a side wall 93 of the lower half 83 and a lower engagement groove 97 communicating with the upper engagement groove 89 from this lower locking recess portion 95. Also, a locking member 107 has at both ends of a bridge portion 105 having a U-shaped cross section an upper locking pawl end portion 101 and a lower locking pawl end portion 103 which are engaged with the upper locking recess portion 87 and lower locking recess portion 95, respectively.

When coupling the upper half 81 and the lower half 83 having such a structure, as shown in FIG. 4B, the upper half 81 is overlapped with the lower half 83 in a capped manner, the upper locking pawl end portion 101 of the locking member 107 and the lower locking pawl end portion 103 of the locking member 107 are engaged with the upper engagement recess portion 87 of the upper half 81 and the lower locking recess portion 95 of the lower half 83, respectively so that the upper half 81 and the lower half 83 are engaged with each other. At this time, the bridge portion 105 of the locking member 107 is engaged with the upper engagement groove 89 of the upper half 81 and the lower engagement groove 97 of the lower half 83.

When the upper half 81 and the lower half 83 are to be disassembled apart from each other, the engagement of the upper locking recess portion 87 of the upper half 81 with the upper locking pawl end portion 101 of the locking member 107 is released and at the same time, the engagement of the lower locking recess portion 95 of the lower half 83 with the lower locking pawl end portion 103 of the locking member 107 is released whereby the locking member 107 is removed. The coupling between the upper half 81 and the lower half 83 can be thus released.

Figure 6:
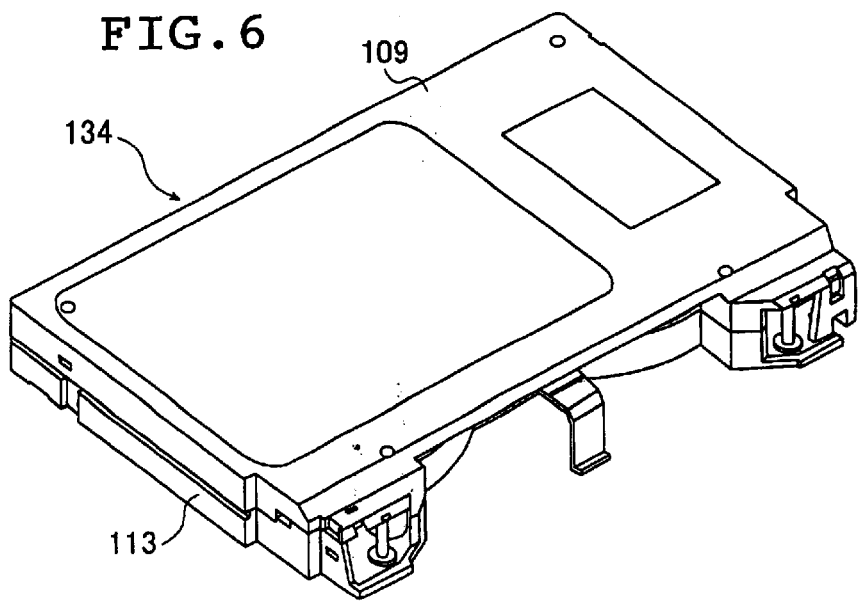
FIG. 6 is a perspective view of the coupled condition of the upper half with the lower half in the magnetic tape cartridge having the engagement structure shown in FIGS. 1A and 1B.
Figure 5:
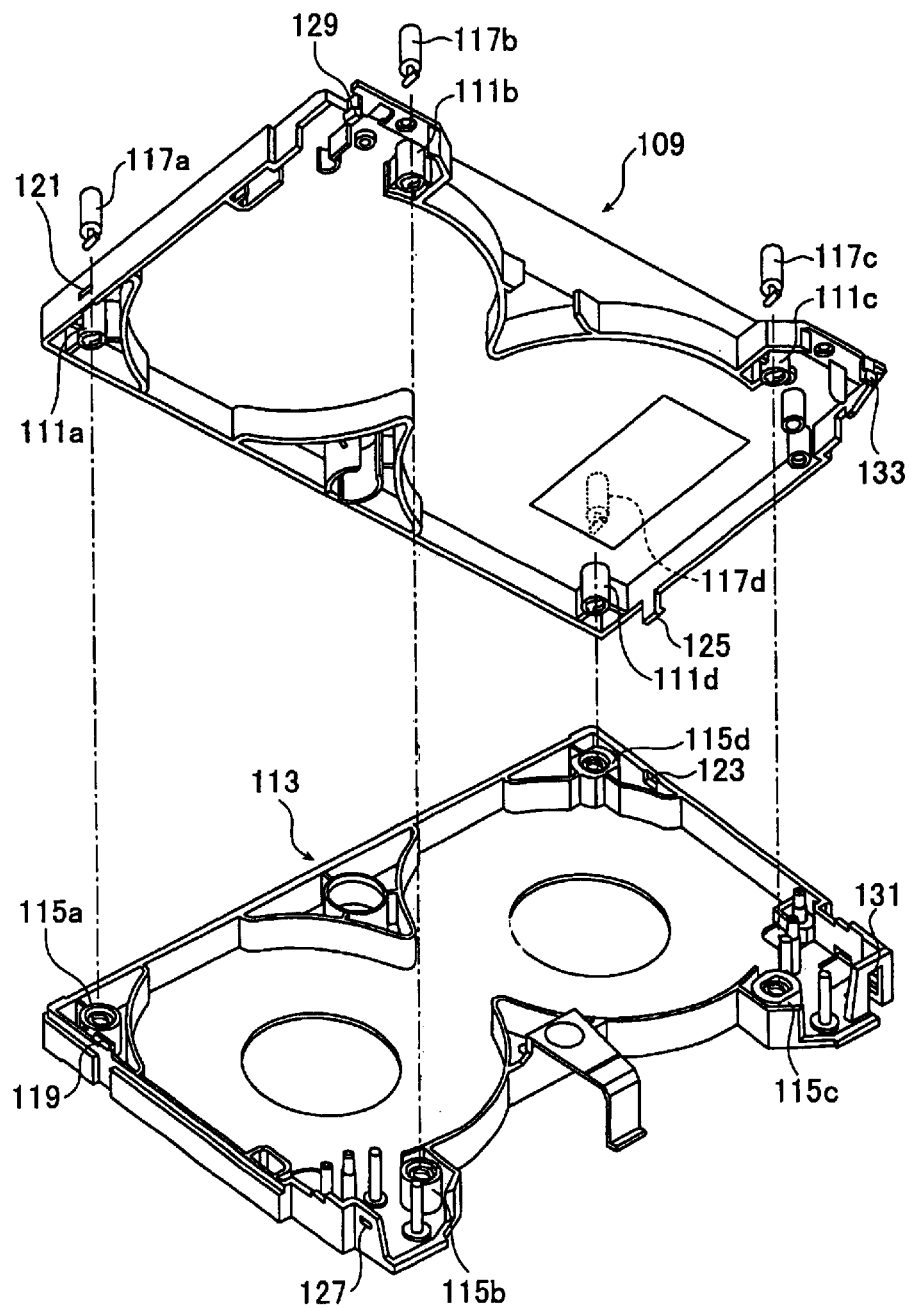
FIG. 5 is an exploded perspective view of the upper and lower halves of a magnetic tape cartridge having the engagement structure shown in FIGS. 1A and 1B.

FIGS. 5 and 6 show an embodiment of a magnetic tape cartridge obtained by coupling the upper half and the lower half having the structure shown in FIGS. 1A and 1B.

In this magnetic tape cartridge, upper engagement portions 111a, 111b, 111c and 111d provided at four corners of the upper half 109 and lower engagement portions 115a, 115b, 115c and 115d provided in the lower half 113 corresponding to the respective upper engagement portions are engaged as shown in FIG. 1B by using locking members 117a, 117b, 117c and 117d so that the upper half 109 and the lower half 113 are engaged with each other.

Also, in this magnetic tape cartridge, a locking pawl 119 projecting upwardly from a left rear portion side wall of the lower half 113 is engaged with a locking recess portion 121 formed in a left rear portion side wall of the upper half 109, whereas a locking pawl 125 projecting downwardly from a right rear portion side wall of the upper half 109 is engaged with a locking recess portion 123 formed in a right rear portion side wall of the lower half 113. Furthermore, a locking pawl 129 projecting from a left front portion of the upper half 109 is engaged with a locking recess portion 127 formed in a left front portion side wall of the lower half 113, whereas a locking pawl 133 projecting from a right front portion of the upper half 109 is engaged with a locking recess portion 131 formed in a right front portion side wall of the lower half 113.

As shown in FIG. 6, with such an engagement structure, a case body 134 is constructed by coupling the upper half 109 and the lower half 113 together. In the same manner as in the conventional magnetic tape cartridge shown in FIG. 9, this case body 134 may receive tape reels around which a magnetic tape is wound therein and may form the magnetic tape cartridge in which a front lid is mounted rotatably in the front portion.

When this magnetic tape cartridge is to be disassembled, as described in conjunction with FIG. 1B, the locking members 117a, 117b, 117c and 117d are rotated and the longitudinal direction of each locking end is identified with the longitudinal direction of cross-section of the fitting hole and the insertion hole. Thereafter, the locking members 117a, 117b, 117c and 117d are pulled out upwardly through the engagement hole so that the engagement between the upper half 109 and the lower half 113 by the locking members 117a, 117b, 117c and 117d is released.

At this time, the engagement between the locking pawl 119 and the locking recess portion 121, the engagement between the locking recess portion 123 and the locking pawl 125, the engagement between the locking recess portion 127 and the locking pawl 129 and the engagement between the locking recess portion 131 and the locking pawl 133 are simultaneously released so that the coupling between the upper half 109 and the lower half 113 may be released and the magnetic tape cartridge may be disassembled.

Figure 7:
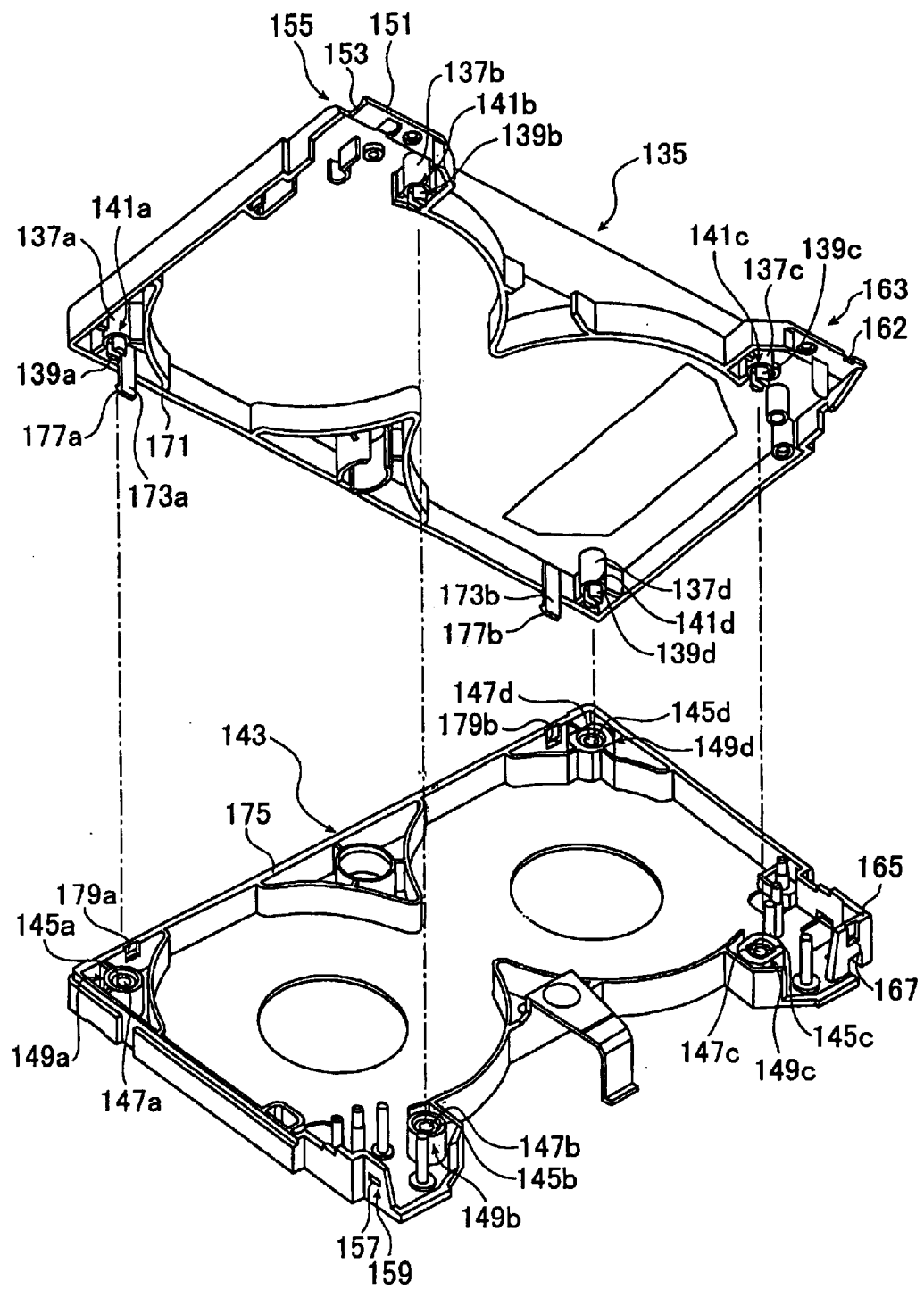
FIG. 7 is an exploded perspective view of the upper and lower halves of a magnetic tape cartridge having the engagement structure shown in FIGS. 3A, 3B, 4A and 4B.
Figure 8:
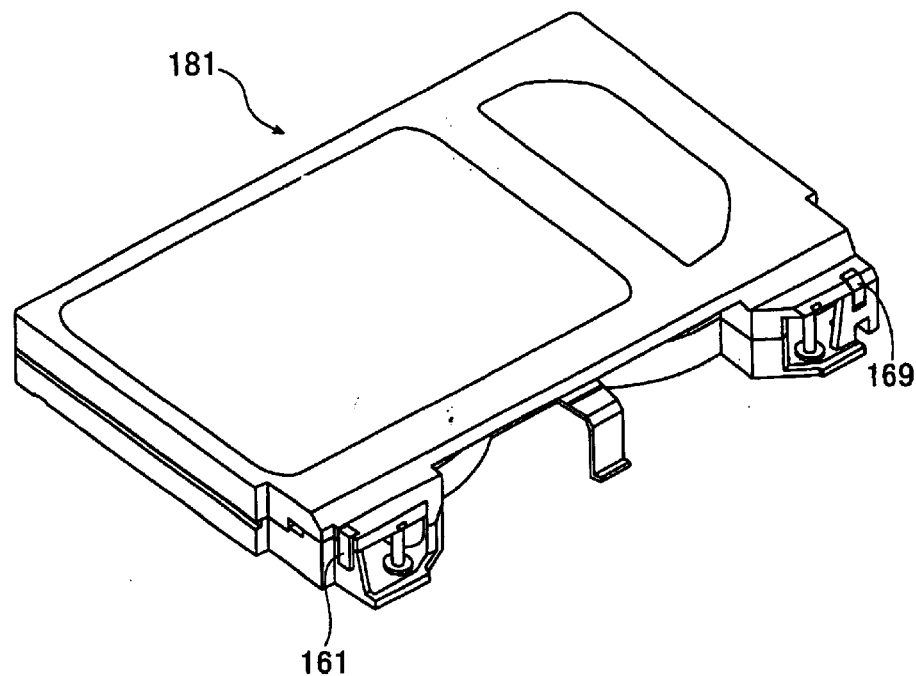
FIG. 8 is a perspective view of the coupled condition of the upper half with the lower half in the magnetic tape cartridge having the engagement structure shown in FIGS. 3A, 3B, 4A and 4B.

Also, FIGS. 7 and 8 show an embodiment of a magnetic tape cartridge obtained by coupling the upper half and the lower half having the structure shown in FIGS. 3A and 3B and FIGS. 4A and 4B.

In this magnetic tape cartridge, in the same manner as in FIGS. 3A and 3B, the upper half 135 has upper engagement portions 141a, 141b, 141c and 141d having split cylindrical locking members 139a, 139b, 139c and 139d projecting from the bottom surface of ribs 137a, 137b, 137c and 137d implanted at four corners of the inner surface thereof. The lower half 143 has lower engagement portions 149a, 149b, 149c and 149d defined by engagement holes 145a, 145b, 145c and 145d into which the lower ends of the ribs 137a, 137b, 137c and 137d are fitted and insertion holes 147a, 147b, 147c and 147d which are formed in the bottom surface of engagement holes 145a, 145b, 145c and 145d and into which locking members 139a, 139b, 139c and 139d are fitted.

Also, in the same manner as in FIGS. 4A and 4B, this magnetic tape cartridge has engaged an upper locking recess portion 153 formed in a side edge end portion 151 of an upper surface front portion of the upper half 135, an upper engagement portion 155 having this upper locking recess portion 153 and a lower engagement portion 159 having a lower engagement recess portion 157 formed in the side wall front portion of the lower half 143 by a locking member 161 as shown in FIG. 8. Furthermore, as shown in FIG. 8, an upper engagement portion 163 having an upper engagement recess portion 162 provided at a right front edge of the upper half 135 and a lower engagement recess portion 167 formed in a side wall 165 implanted in a right front edge of the lower half 143 are engaged with each other by a locking member 169.

Furthermore, this magnetic tape cartridge has engagement pawl portions 173a and 173b projecting from a rear side wall 171 of the upper half 135 and engagement recess portions 179a and 179b which are provided in a rear side wall 175 of the lower half 143 and with which tip end pawl portions 177a and 177b of the engagement pawl portions 173a and 173b are engaged.

In this magnetic tape cartridge, for coupling the upper half 135 and the lower half 143, the upper half 135 is overlapped with the lower half 143 in a capped manner so that the locking members 139a, 139b, 139c and 139d provided on the upper half 135 are press-fitted in the fitting holes 147a, 147b, 147c and 147d and the lower ends of the ribs 137a, 137b, 137c and 137d are fitted in the engagement holes 145a, 145b, 145c and 145d. Also, the upper locking recess portions 153 and 162 provided in the upper half 135 and the lower locking recess portions 157 and 167 provided in the lower half 143 are engaged with each other by using the locking members 161 and 169 and the engagement pawl portions 173a and 173b provided on the upper half 135 and the engagement recess portions 179a and 179b provided in the lower half 143 are engaged with each other so that the upper half 135 and the lower half 143 may be coupled.

Thus, the case body 181 shown in FIG. 8 may be constructed. In the same manner as in the conventional magnetic tape cartridge shown in FIG. 24, this case body 135 may receive tape reels around which a magnetic tape is wound therein and may form the magnetic tape cartridge in which a front lid is mounted rotatably in the front portion.

Also, when this magnetic tape cassette is to be disassembled, for example, first of all, the locking members 161 and 169 are removed from the upper locking recess portions 153 and 162 provided in the upper half 135 and the lower engagement recess portions 157 and 167 provided in the lower half 143, the jig is inserted from below the lower engagement portions 149a, 149b, 149c and 149d from the bottom surface side of the lower half 143 to push the locking members 139a, 139b, 139c and 139d upwardly toward the upper half 135 to be pulled out from the engagement holes 145a, 145b, 145c and 145d, and furthermore, the engagement between the engagement pawl portions 173a and 173b provided on the upper half 135 and the engagement recess portions 179a and 179b provided in the lower half 143 are released so that the engagement of the upper half 135 and the lower half 143 may be released.

In the magnetic tape cartridge having such a structure, it is possible to couple the upper half and the lower half together by means of the locking members and the engagement portions provided in the upper half and the lower half corresponding to the locking members without using metal made coupling members such as screws. Accordingly, if the locking members are formed of resin material, it is unnecessary to perform a troublesome process such as separating the screws made of metal apart upon disassembling the magnetic tape cartridge. It is easy to sort, collect and recycle the resin material, which is effective to reduce the waste resin material. Also, it is possible to easily assemble and disassemble the upper half and the lower half.

In the magnetic tape cartridge shown in the embodiment, it is possible to easily couple the upper half and the lower half without using metal members such as screws and in addition, upon assembling, it is possible to keep the firm coupling and to constitute the firm case body, whereas upon disassembling the case body, it is easy to separate the upper half and the lower half apart from each other. Also, it is easy to sort, collect and recycle the resin material, which is effective to reduce the waste resin material.

An embodiment of the recording media cartridge according to a second aspect of the present invention will now be described with reference to FIGS. 9 to 13. Also in this embodiment, an example in which the present invention is applied to a DVC is shown as in the first aspect.

Figure 9:
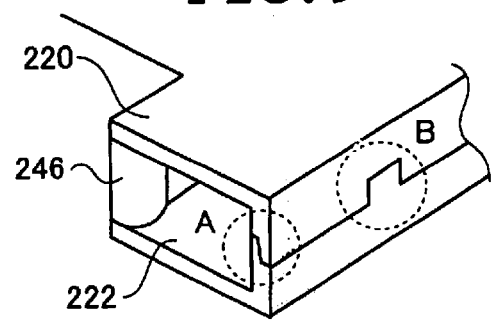
FIG. 9 is a schematic perspective view of the vicinity of a combined lock means of a magnetic tape cartridge according to another embodiment of the present invention.
Figure 10:
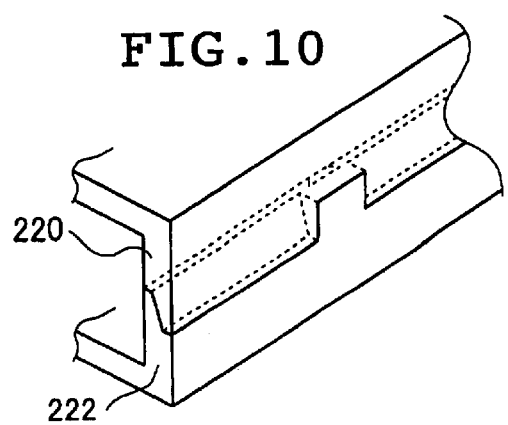
FIG. 10 is an exploded perspective view showing the detail of the vicinity of the combined lock means shown in FIG. 9.

FIG. 9 is a schematic perspective view showing the vicinity of an exemplary combined lock means in an embodiment of the magnetic tape cartridge in accordance with the second aspect of the present invention and FIG. 10 is an exploded perspective view showing its detail. Note that, here, the portions that are not directly related are omitted. Also, in the following description, the overall structure of the above-described magnetic tape cartridge is omitted and only the main points thereof will be described.

FIG. 9 shows on the enlarged scale the vicinity of a tape guide and a screw boss on the lid side (front side) of the magnetic tape cartridge shown in FIG. 24 above. (However, here, since the coupling with screws is omitted, there is provided no screw boss.) Reference numeral 220 denotes an upper half, numeral 222 denotes a lower half and numeral 246 denotes a tape guide. Here, FIG. 10 is an enlarged view of a portion encircled by a small circle A of FIG. 9 and shows a state where the side wall of the upper half 220 and the side wall of the lower half 222 are coupled with each other with a taper.

Figure 11A:
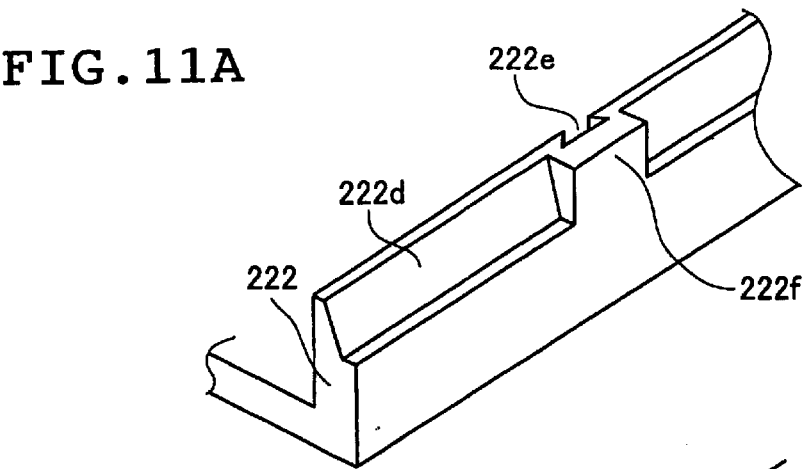
FIGS. 11A and 11B are exploded perspective views showing the detailed structure of a two-dimensional (x- and y-directions) combined lock means of the magnetic tape cartridge according to the embodiment, FIG. 11A being a perspective view showing the lower half and FIG. 11B being a perspective view showing the inner surface side of the vertically turned-over upper half.
Figure 11B:
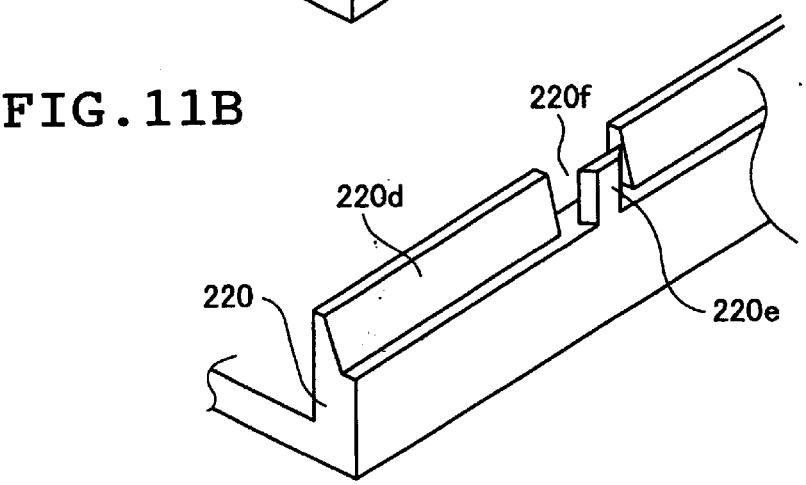

FIGS. 11A and 11B are enlarged views of a portion encircled by a small circle B of FIG. 9 and are exploded perspective views showing a detailed structure of the above-described combined lock means, i.e., two-dimensional (x-, and y-directions) combined lock means for the upper half 220 and the lower half 222 of the magnetic tape cartridge according to this embodiment. FIG. 11A is a perspective view showing the lower half 222 and FIG. 11B is a perspective view showing the inner surface of the upper half 220 which has been vertically turned over. The structure and the operation of this embodiment will now be described in detail.

In this embodiment, the above-described combined lock means is provided in a predetermined position in the vicinity of the tape guide 246 of the magnetic tape cartridge. In FIGS. 11A and 11B, numeral 220 denotes the upper half and numeral 222 denotes the lower half. Reference symbols 220d, 222d denote the tapered surfaces that are the joint surfaces of the upper and lower halves and symbols 220e, 222e denote the engagement portions for limiting the position in the y-direction, additionally provided.

In the magnetic tape cartridge according to this embodiment, first of all, the upper and lower halves are coupled while the above-described tapered surfaces 220d, 222d are aligned with each other. However, only with this, there is a possibility of displacement of the upper and lower halves in the x-direction and the y-direction in the drawings. In order to prevent such displacement, the additional engagement portions 220e, 222e are provided. The structure will now be described in more detail.

Namely, the engagement portion 220e for limiting the position in the y-direction on the side of the upper half 220 shown in FIG. 11B is inserted (vertically turned over) into the engagement portion 222e for limiting the position in the y-direction on the side of the lower half 222 shown in FIG. 11A so that the upper half 220 and the lower half 222 are limited with respect to the position in both the x- and y-directions to thereby make it possible to prevent the above-described displacement in the x- and y-directions of the upper and lower halves.

In order to smoothly perform the coupling and dismounting of the upper and lower halves, it is preferable to provide the taper on the outer surface side (on the inner side in FIG. 11B) of the y-direction position limiting engagement portion 220e on the side of the above-described upper half 220. Also, the cross-sectional shapes of the above-described additional engagement portions 220e and 222e are not limited to the trapezoidal shape shown in FIGS. 11A and 11B but may be formed in any desired shape.

With the magnetic tape cartridge according to this embodiment, it is possible to obtain the effect that the upper and lower halves are coupled with each other with the taper surfaces and the above-described additional engagement portions 220e, 222e coupled with each other to thereby make it possible to couple the vicinity of the tape guide 246 with high contactability. Note that, in this case, any special tool is not required and also upon disassembling, it is unnecessary to use the special tool or the like.

In the above-described embodiment, the provision of the taper in the joint portion of the upper and lower halves is omitted in the portion forming the above-described additional engagement portions 220e, 222e and the upper and lower halves are coupled in a flat manner (portions indicated by symbols 220f, 222f: engagement portion forming portions). However, this is made for the purpose of facilitating the forming operation and is not the essential factor. Namely, it is possible to couple these portions with each other with the tapers in the upper and lower halves in the same manner as in the above-described coupling portions around there.

Figure 12A:
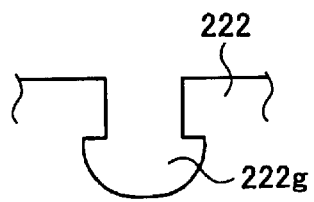
FIGS. 12A and 12B are frontal views showing a combined lock means of a magnetic tape cartridge according to yet another embodiment of the present invention.
Figure 12B:
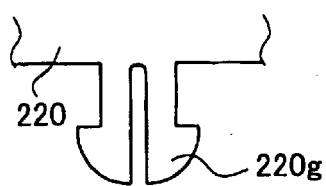

FIGS. 12A and 12B show the combined lock means in another embodiment of the magnetic tape cartridge according to the second aspect of the present invention. In this embodiment, in addition to the displacement preventing function in the x- and y-directions of the magnetic tape cartridge according to the foregoing embodiment, there is provided the upper and lower half locking function in the z-direction (direction perpendicular to the paper surface of the drawings), i.e., the upper and lower half engagement condition keeping function.

FIG. 12A is a view corresponding the inner surface side (inner side of the drawing) of the lower half shown in FIG. 11A and shows the state where the shape of the above-described additional engagement portion 222e is changed from a straight shape to a shape having an expansion at the tip end portion (on the inner side). In conjunction with this, also the shape of the additional engagement portion 220e of the upper half is changed from the straight shape to the shape 220g having an expansion at the tip end portion (inner side) as shown in FIG. 12B.

In the magnetic tape cartridge according to this embodiment, the shapes of the additional engagement portions 220e, 222e are changed to the shapes 220g, 222g for exhibiting the locking function after insertion as shown in FIGS. 12A and 12B to thereby ensure the new function to further stabilize the locking in the z-direction in addition to the effect owned by the magnetic tape cartridge having the structure shown in the foregoing embodiment.

Note that, in the magnetic tape cartridge according to the foregoing embodiment, the shape for exhibiting the locking function after the insertion of the additional engagement portions 220e, 222e is not limited to the shapes (220g, 222g) shown in FIGS. 12A and 12B but may be formed in any desired shape which may be utilized extensively.

Figure 13:
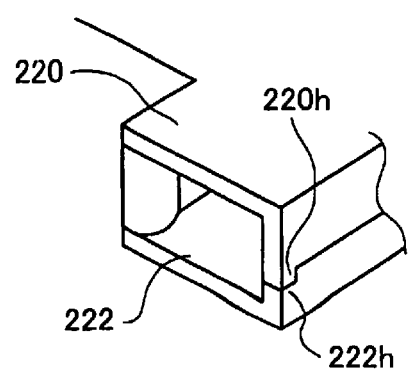
FIG. 13 is a perspective view showing the combined lock means of a magnetic tape cartridge according to still another embodiment of the present invention.

FIG. 13 shows the above-described combined lock means in a magnetic tape cartridge according to still another embodiment of the present invention. In this embodiment, the positional limit in the two dimensions (x- and y-directions) upon coupling of the upper and lower halves is more ensured. Namely, in addition to the coupling of the upper and lower halves having the tapers as shown in the foregoing embodiment, crank-type engagement portions 220h, 222h are provided at free or open ends.

Then, in the magnetic tape cartridge according to this embodiment, the above-described crank type engagement portions 220h, 222h are engaged with each other, thereby more positively preventing the movement in the y-direction and enhancing the stability of the coupling of the upper and lower cases. Of course, the crank type engagement portions 220h, 222h may be provided in any other similar free or open ends.

With the magnetic tape cartridge according to this embodiment, it is possible to ensure the effect to make it possible to realize the positional limit in the two-dimensional directions (x- and y-directions) with a simple structure. Also, it is possible to obtain the effect to make it possible to enhance the contactability of the upper and lower halves at the free or open ends of the magnetic tape cartridge.

Namely, according to this embodiment, since the combined lock means of the upper and lower halves with respect to the two directions perpendicular to each other at least along the side walls of the upper and lower cases is provided, it is possible to ensure the remarkable effect to make it possible to enhance the contactability of the upper and lower cases particularly at the free or open ends.

Then, an embodiment of the recording media cartridge according to a third aspect of the present invention will now be described with reference to FIGS. 14 to 23. In this embodiment, there is shown an example in which the present invention is applied to a so-called DDC (digital data storage) type magnetic tape cartridge.

Figure 14:
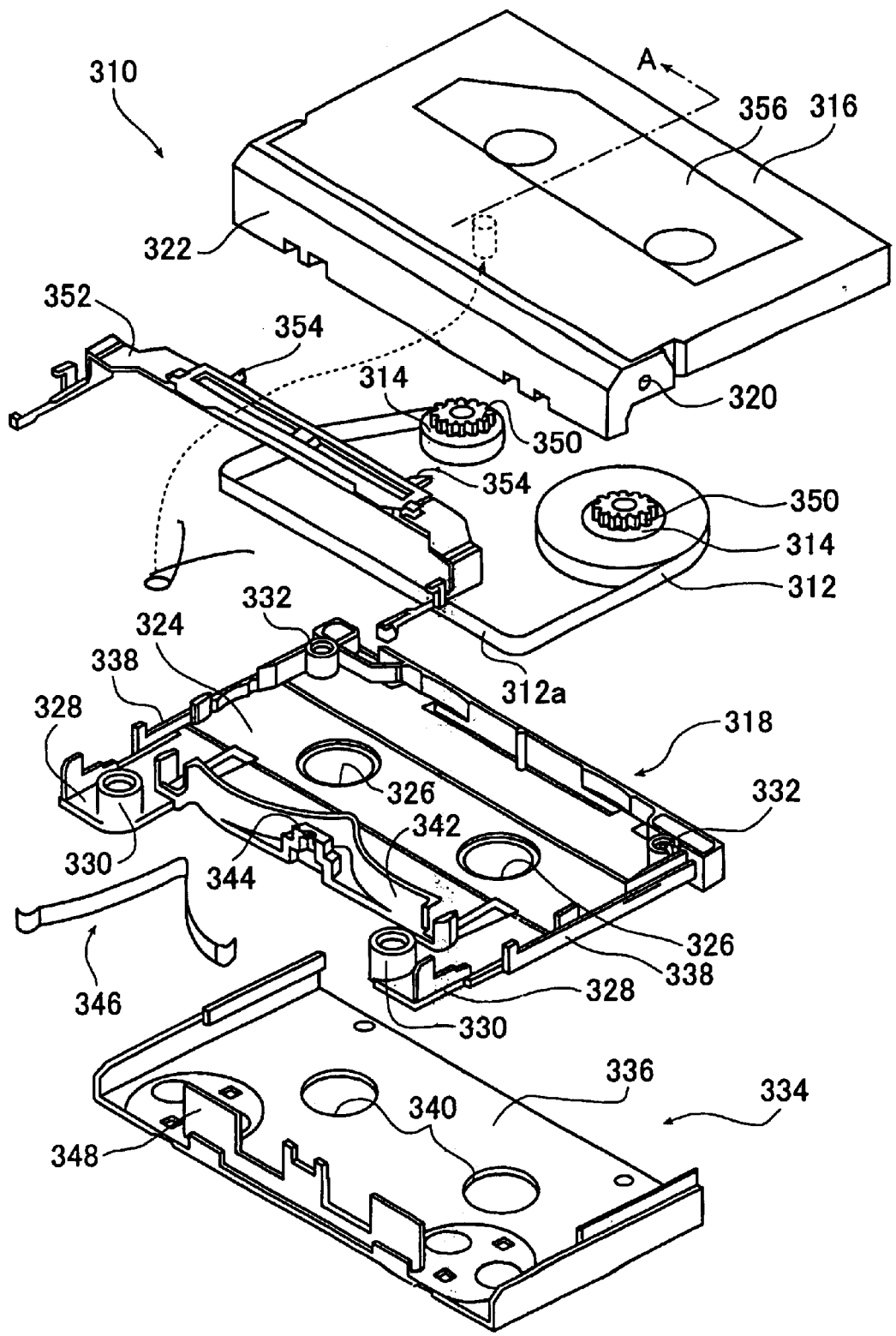
FIG. 14 is an exploded perspective view showing a magnetic tape cartridge having a fastening structure of a case body according to still another embodiment of the present invention.
Figure 15:
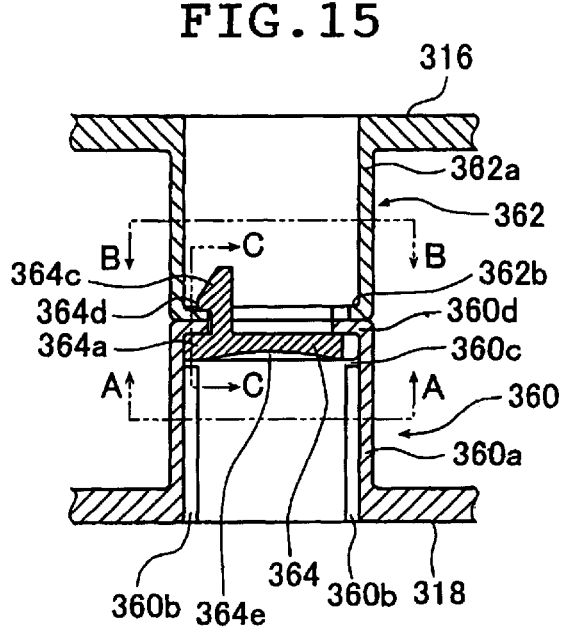
FIG. 15 is a cross-sectional view showing in detail a fastening structure of a case body of the magnetic tape cartridge shown in FIG. 14.
Figure 16:
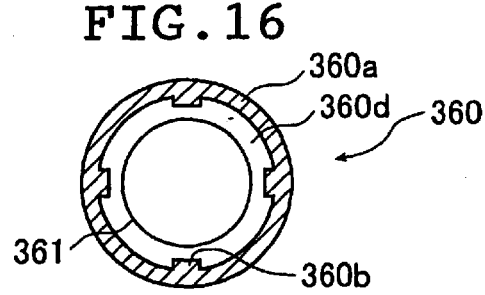
FIG. 16 is a cross-sectional view taken along the line A—A of a first coupling boss shown in FIG. 15.
Figure 17:
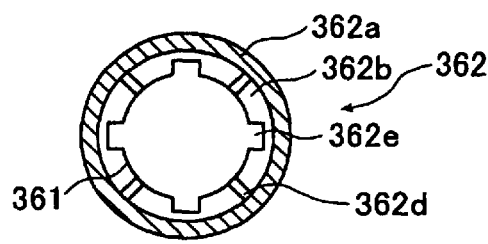
FIG. 17 is a cross-sectional view taken along the line B—B of a second coupling boss shown in FIG. 15.
Figure 18:
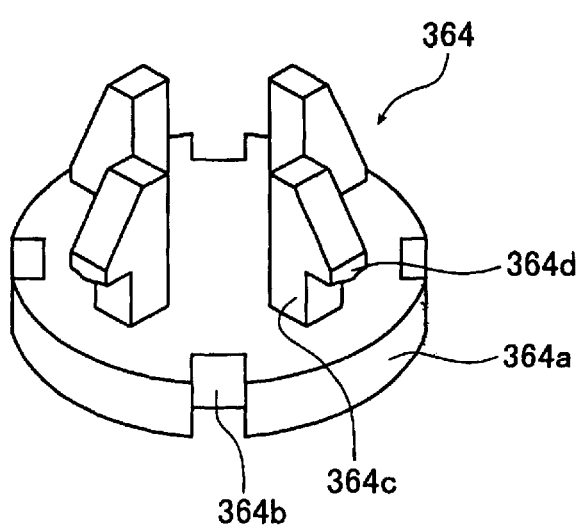
FIG. 18 is a perspective view of a fastening member shown in FIG. 15.
Figure 19:
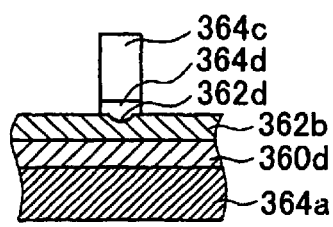
FIG. 19 is a cross-sectional view taken along the line C—C of FIG. 15.

FIG. 14 is an exploded perspective view of a magnetic tape cartridge having a fastening structure of a characteristic case body (cartridge case) of this embodiment according to the third aspect of the present invention. FIG. 15 is a cross-sectional view of the fastening structure portion of the case body that is its primary part. FIG. 16 is a cross-sectional view taken along the line A—A of FIG. 15. FIG. 17 is a cross-sectional view taken along the line B—B of FIG. 15. FIG. 18 is a perspective view of a fastening member. FIG. 19 is a cross-sectional view taken along the line C—C of FIG. 15.

As shown in FIG. 14, in a magnetic tape cartridge 310 according to this embodiment, both ends of a magnetic tape 312 having a predetermined length are fixed to a pair of takeup hubs (tape reels) 314, 314 and the tape are wound around the takeup hubs 314, 314 from both ends, respectively. Then, the pair of takeup hubs 314, 314 around which the magnetic tape 312 is wound is received rotatably within the case body constituted by coupling the upper half 316 and the lower half 318. The magnetic tape 312 is tensioned through a predetermined path between the pair of takeup hubs 314, 314. Only a projecting portion 312*a* of the magnetic tape corresponding to the position of the magnetic head of the recording/reproducing apparatus (not shown) may be exposed to the outside.

In order to cover and protect a magnetic layer surface of the projecting portion 312*a* of the magnetic tape exposable from this case body, a lid (front cover) 322 axially supported by pins 320 is provided on the upper half 316 swingably between a closing position to cover the projecting portion 312*a* of the magnetic tape and an opening position for exposing the magnetic tape. This lid 322 is biased toward the closing position by a torsion coil spring (not shown).

The lower half 318 has a rectangular bottom plate 324. The pair of takeup hubs 314, 314 around which the magnetic tape 312 is wound are rotatably supported in the middle of the bottom plate 324. Reel shaft insertion holes 326, 326 in which reel shafts (not shown) protruding from the recording/reproducing apparatus (not shown) are inserted into the takeup hubs 314, 314 when the magnetic tape cartridge is loaded on the recording/reproducing apparatus are provided for rotating the takeup hubs 314, 314.

Furthermore, projecting portions 328, 328 are formed extending forward from right and left ends of the bottom plate 324. Coupling bosses 330, 330 serving as columnar tape guide for guiding the magnetic tape 312 tensioned between the pair of takeup hubs 314, 314 to a front surface of the case body through a predetermined route and coupling the upper half 316 and the lower half 318 of the case body are implanted vertically from the bottom plate 324 in the right and left projecting portions 328, 328. The space between the right and left projecting portions 328, 328 becomes a space where the bottom plate 324 of the lower half 318 is not present and forms an opening portion of the case body.

The coupling bosses 330, 330 constitute the fastening structure of the case body of the magnetic tape cartridge in accordance with this embodiment and its detail will be described later. Coupling bosses 332, 332 having a similar structure are provided at right and left corners on the rear side of the lower half 318. These four coupling bosses are fastened by fastening members described below to thereby constitute the fastening structure of the case body for coupling and fastening the upper half and the lower half of the case body each other. The upper and lower halves of the cartridge in which the magnetic tape 312 and the like are assembled are coupled integrally together to form the magnetic tape cartridge 310.

A slider 334 has a thin flat bottom plate 336 provided from the lower side in contact with the bottom plate 324 of the lower half 318. This bottom plate 336 is used to close the opening portion of the case body and the reel shaft insertion holes 326, 326 provided in the lower half 318 for preventing the dust from entering and is slidable back and forth by the guidance of side walls 338, 338 of the lower half 318 to move forward to close the opening portion of the case body and the reel shaft insertion holes 326, 326 by the bottom plate 336 and to move backward to open the opening portion of the case body while identifying the positions of the reel shaft insertion holes 326, 326 of the lower half 318 and the reel shaft insertion holes 340, 340 of the slider 334 so that the above-described reel shafts of the recording/reproducing apparatus may be inserted thereto.

An intermediate wall 342 curved in an arcuate form along the magnetic tape 312 wound around the takeup hubs 314 is provided on the bottom plate 324 of the lower half 318. A leaf spring mounting portion 344 is implanted in front of a recess portion formed in the central joint portion of the intermediate wall 342. A slider spring 346 formed of a leaf spring is inserted between the recess portion formed in the central joint portion of the intermediate wall 342 and the leaf spring mounting portion 344. A rib 348 provided on the front side of the slider 334 is depressed so that the slider 334 is biased forwardly (in the direction to close the slider 334).

Gears 350 are provided in the middle of the pair of takeup hubs 314, 314, respectively. Braking pieces 354, 354 of a brake member 352 provided on the upper half 316 are engaged with the gears 350, 350 to form a rotation preventing mechanism of the takeup hubs for preventing accidental rotation of the takeup hubs 314, 314 when the magnetic tape cartridge 310 is not used. Then, a transparent window 356 for visually confirming the takeup amount of the takeup hubs 314 is formed in the upper half 316.

Subsequently, the fastening structure of the case body according to this embodiment as shown in FIG. 15 is provided at four corners of the case body composed of the upper half 316 and the lower half 318. As shown in FIG. 15, the fastening structure is composed of a first coupling boss 360 provided on the lower half 318, a second coupling boss 362 provided on the upper half 316 and a fastening member 364 for coupling and firmly fastening the first coupling boss 360 and the second coupling boss 362.

The first coupling boss 360 provided on the lower half 318 has a cylindrical portion 360*a* extending upwardly and formed in a cylindrical shape. As shown in FIG. 16, on the inner side thereof, four guide ways 360*b* are provided vertically at an interval of 90 degrees. The guide ways 360*b* are used to guide and insert the fastening member 364 unrotatably as described later in detail. A larger cutout portion 360*c* than a thickness of a flange portion 364*a* of the fastening member 364 is provided at the insertion end of the fastening member 364 for keeping the fastening member 364 unrotatable after the insertion.

The second coupling boss 362 provided on the upper half 316 has a cylindrical portion 362*a* extending downwardly and formed in a cylindrical shape as well. Much larger release grooves 362e than locking pieces 364c of the fastening member 364 to be described later are provided at positions corresponding to the guide ways 360b on the bottom surface 362b formed at the lower end of the cylindrical portion 362a. Also, recess portions 362d are formed on the locking surface for engaging the locking pieces 364c of the fastening member 364 in positions offset by 45 degrees from the above-described guide ways 360b on the bottom surface 362b formed at the lower end of the above-described cylindrical portion 362a.

As shown in FIG. 18 in a perspective view, the fastening member 364 has a flange portion 364a and first guide grooves 364b provided in four positions at an interval of 90 degrees in the side surface of the flange portion 364a. The first guide grooves 364b provided in the flange portion 364a are used to loosely engage with the guide ways 360b and to guide such that the fastening member 364 is inserted without any rotation when the fastening member 364 is inserted from below into the first coupling bosses 360 of the lower half 318. Thus, the locking pieces 364c of the fastening member 364 may be inserted into the first coupling boss 360 and the second coupling boss 362.

The four locking pieces 364c are provided at offset positions by 45 degrees from the first guide grooves 364b on the upper surface of the flange portion 364a of the fastening member 364. The locking pieces 364c are inserted into a ring 361 when the fastening member 364 is inserted along the guide ways 360b of the first coupling boss 360. The fastening member 364 is inserted into the insertion end so that the locking pawls 364d of the locking pieces 364c pass through the above-described ring 361 and are engaged with the recess portions 362d as shown in FIG. 19. The upper surface 360d of the first coupling boss 360 and the bottom surface 362b of the second coupling boss 362 are overlapped and firmly fixed together by the locking pawls 364d to fasten the cartridge case without any hindrance against the detachment from and attachment to the recording/reproducing apparatus or carrying. Then, furthermore, in this embodiment, the locking pawls 364d are engaged with the recess portions 362d to thereby prevent the rotation of the locking pawls 364d.

When the coupling of the upper half 316 and the lower half 318 by this fastening member 364 is to be released, the fastening member 364 is rotated by 45 degrees and the locking pawls 364d are rotated to the positions of the release grooves 362e so that the coupling of the upper half 316 and the lower half 318 may be released and separated. A driver groove 364e is provided as an engagement portion for engaging a rotary tool that is used in releasing the coupling of the upper half 316 and the lower half 318 by the fastening member 364 on the lower surface of the flange portion 364a. In this embodiment, the driver groove 364e is adopted as the engagement portion for engaging with the rotary tool. However, it is sufficient to rotate the fastening member 364 by 45 degrees. For example, it is possible to form two or three holes instead of the driver groove and insert pins of the rotary tool into these holes for rotation, as described above.

Since the fastening structure of the case body according to this embodiment is thus constructed, the locking pieces are inserted along the guide ways without any rotation when the fastening member for coupling the upper and lower halves is to be inserted. Accordingly, the locking pawls are inserted without fail. It is possible to overlap and firmly fix the upper surface of the first coupling boss and the bottom surface of the second coupling boss by the engagement pawls. Then, since the locking pawls of the locking pieces are engaged with the recess portions to thereby prevent the rotation, there is no fear that the fastening is loosened and the halves are removed apart from each other in carrying or attachment to or detachment from the recording/reproducing apparatus.

Figure 20:
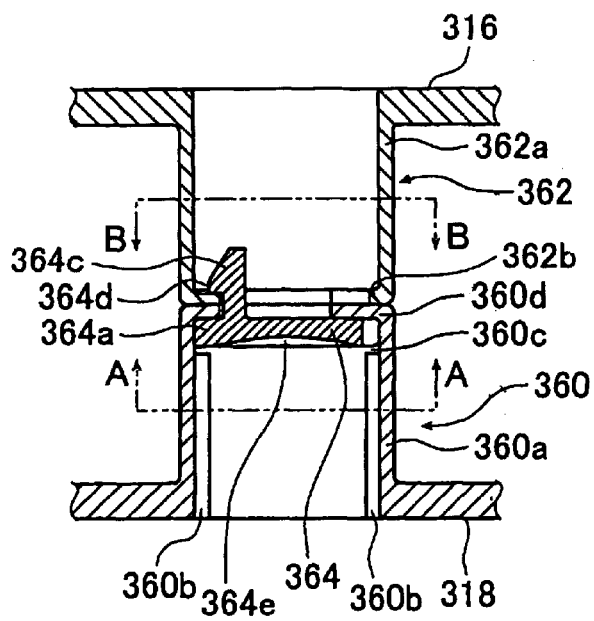
FIG. 20 is a cross-sectional view showing in detail a fastening structure of a case body according to still another embodiment of the present invention.
Figure 21:
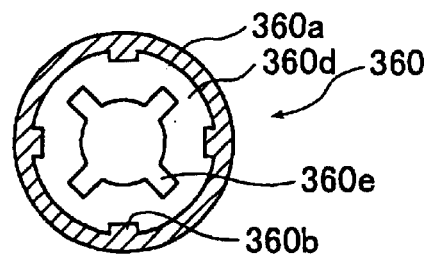
FIG. 21 is a cross-sectional view taken along the line A—A of a first coupling boss shown in FIG. 20.
Figure 22:
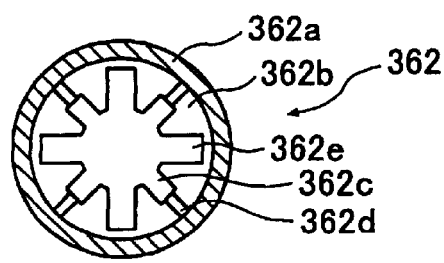
FIG. 22 is a cross-sectional view taken along the line B—B of a second coupling boss shown in FIG. 20.

Another embodiment of the recording media cartridge according to the third aspect of the present invention will now be described with reference to FIGS. 20 to 22. FIG. 20 is a cross-sectional view showing in detail a fastening structure of a case body corresponding to that of FIG. 15 described above. FIG. 21 is a cross-sectional view taken along the line A—A of the embodiment shown in FIG. 20 as in FIG. 16. FIG. 22 is a cross-sectional view taken along the line B—B of FIG. 20.

In this embodiment, in the same manner as in the foregoing embodiment, a first coupling boss 360 provided on the lower half 318 has a cylindrical portion 360a extending upwardly and formed in a cylindrical shape. As shown in FIG. 21, four guide ways 360b are provided vertically on an inside surface of the cylindrical portion 360a at an interval of 90 degrees. The guide ways 360b are used to guide and insert the fastening member 364 unrotatably as described later in detail. A larger cutout portion 360c than a thickness of a flange portion 364a of the fastening member 364 is provided at the insertion end of the fastening member 364 for keeping rotatable the fastening member 364 after the insertion also in the same manner as in the foregoing embodiment. Also, to be described later, four second guide grooves 360e for guiding the locking pieces 364c of the fastening member 364 are arranged on an upper surface 360d of the first coupling bass 360 in this embodiment at an interval of 90 degrees in positions offset by 45 degrees from the guide ways 60b.

On the other hand, also in the same manner as in the foregoing embodiment, a second coupling boss 362 provided on the upper half 316 has a cylindrical portion 362a extending downwardly and formed in a cylindrical shape. As shown in FIG. 22, third guide grooves 362c having the same size as that of the second guide grooves 360e of the first coupling boss 360 provided in the lower half 318 are provided in the same positions as those of the second guide grooves 360e to be continuous therewith. Recess portions 362d are formed in the locking surface for locking the locking pieces 364c of the fastening member 364 on the outside of the third guide grooves 362c. Furthermore, much larger release grooves 362e than the locking pieces 364c of the fastening member 364 are provided in positions offset by 45 degrees from the third guide grooves 362c (i.e., the same positions as those of the guide ways 360b of the first coupling boss 360).

As described above, the four locking pieces 364c are provided at offset positions by 45 degrees from the first guide grooves 364b on the upper surface of the flange portion 364a of the fastening member 364. The locking pieces 364c are inserted into the second guide grooves 360e and the third guide grooves 362c when the fastening member 364 is inserted along the guide ways 360b of the first coupling boss 360. The fastening member 364 is inserted into the insertion end so that the locking pawls 364d of the locking piece 364c pass through the second guide grooves 360e and the third guide grooves 362c, respectively, and are engaged with the recess portions 362d as shown in FIG. 19. The upper surface 360d of the first coupling boss 360 and the bottom surface 362b of the second coupling boss 362 are overlapped and firmly fixed together by the locking pawls 364d to fasten the cartridge case without any hindrance against the detachment from and attachment to the recording/reproducing apparatus or carrying. Also, in this embodiment, the locking pawls 364d are engaged with the recess portions 362d to thereby prevent the rotation of the locking pawls 364d.

In the same manner as described above, when the coupling of the upper half 316 and the lower half 318 by this fastening member 364 is to be released, the fastening member 364 is rotated by 45 degrees and the locking pawls 364d are rotated to the positions of the release grooves 362e so that the coupling of the upper half 316 and the lower half 318 may be released and separated. A driver groove 364e is provided as an engagement portion for engaging a rotary tool that is used when the coupling of the upper half 316 and the lower half 318 by the fastening member 364 on the lower surface of the flange portion 364a. In this case, the driver groove 364e is adopted as the engagement portion for engaging with the rotary tool. However, it is sufficient to rotate the fastening member 364 by 45 degrees. For example, it is possible to form two or three holes instead of the driver groove and insert pins of the rotary tool into these holes for rotation.

Since the fastening structure of the case body according to this embodiment is thus constructed, the locking pieces are inserted along the guide ways without any rotation when the fastening member for coupling the upper and lower halves is to be inserted. Thus, the locking pawls are positively inserted into the second guide grooves and the third guide grooves, and it is possible to overlap and firmly fix the upper surface of the first coupling boss and the bottom surface of the second coupling boss by the engagement pawls. Then, since the locking pawls of the locking pieces are engaged with the recess portions to thereby prevent the rotation, there is no fear that the fastening is loosened and the halves are removed apart from each other in carrying or attachment to or detachment from the recording/reproducing apparatus.

Figure 23:
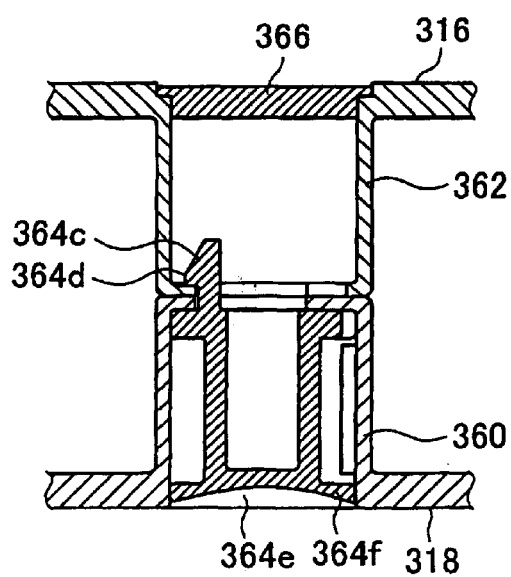
FIG. 23 is a cross-sectional view showing in detail a fastening structure of a case body in accordance with still another embodiment of the present invention.

FIG. 23 is a cross-sectional view showing still another embodiment of the present invention. In this embodiment, since the hollow hole is formed in the first coupling boss 360 and the second coupling boss 362 in the embodiment shown in FIGS. 15 to 19, a lid is provided for the hollow hole in order to prevent the dust from accumulating in this hollow hole. In this embodiment, a discretely prepared lid 366 is fixed to the hole of the second coupling boss 362 by adhering or melt-bonding. The fastening member 364 having a lid portion 364f formed integrally with the fastening member 364 is applied to the hole of the first coupling boss 360. Here, the structure of this embodiment is different only in the points that the lid portion 364f is provided integrally with the fastening member 364 and the guide ways 360b in the position of this lid portion 364f are eliminated and is the same as that of the foregoing embodiment except for the points. Accordingly, the detailed explanation therefor will be omitted.

Since, according to this embodiment, the locking pieces are inserted along the guide ways without any rotation when the fastening member for coupling the upper and lower halves is to be inserted. Thus, the locking pawls are positively inserted into the second guide grooves and the third guide grooves and it is possible to overlap and firmly fix the upper surface of the first coupling boss and the bottom surface of the second coupling boss by the engagement pawls. Then, since the locking pawls of the locking pieces are engaged with the recess portions to thereby prevent the rotation, there is no fear that the fastening is loosened and the halves are removed apart from each other in carrying or attachment to or detachment from the recording/reproducing apparatus.

Also, when the magnetic tape cartridge wasted after use is to be disassembled, the fastening member is rotated so that the locking pawls are rotated to the release grooves whereby it is possible to release the coupling and readily disassemble the upper half and the lower half. However, since the fastening member is rotated and the first guide grooves are moved to the positions displaced from the guide ways, there is no fear that the fastening member is pulled apart from the lower half and lost. Then, if the lower half and the fastening member are formed of the same kind of plastic, there is no hindrance when the plastic is to be reused as the original material.

Note that, the fastening structure of the case body of the magnetic tape cartridge according to the third aspect of the present invention is not limited to those of the foregoing embodiments described above. It goes without saying that various modifications or changes can be made within the scope of the appended claims of the present invention. For example, the first coupling boss is provided in the upper half and the second coupling boss is provided in the lower half so that the fastening member is inserted from above, and the number of the guide grooves and the locking pieces is three at an interval of 120 degrees.

So far, the coupling structure of the recording media cartridge of the present invention and in particular that of the upper and lower halves have been described on the basis of the various embodiments but any one of the above-described embodiments is one example of the present invention. It goes without saying that the present invention is not limited thereto and various modifications and changes are possible suitably within the scope not changing the spirit of the present invention.

As described in detail in the foregoing pages, according to the first aspect of the present invention, the upper half and the lower half may readily be coupled with each other without using metal members such as screws, the firm case body is structured while keeping tight coupling when the upper half is coupled with the lower half, it is easy to separate the upper half from the lower half upon disassembling the case body, and it is easy to sort, collect and recycle the resin material to effectively reduce the waste resin material.

As also described above in detail, the second aspect of the present invention in which a combined lock means for the upper and lower halves functioning at least in two directions perpendicular to each other along the side walls of the upper and lower halves is provided, has particularly a marked effect of improving the adhesion between the upper and lower halves in the free or open ends.

According to this aspect, it is possible to perform assembling the recording media cartridge with an efficiency as high as or higher than that of the cartridge having the conventional structure even if the screws for coupling (assembling) the upper and lower cases of the recording media cartridge are not used, and it is also possible to provide the recording media cartridge of which the basic performance would not be adversely affected by such structural change.

According to this aspect, it is further possible to provide the magnetic tape cartridge which can be assembled with an efficiency as high as or higher than that of the magnetic tape cartridge having the conventional structure, while at the same time, causing no reduction in the strength and shape stability (no generation of twist or warpage) of the magnetic tape cartridge and of which the basic performance cannot be adversely affected by the changes in the assembling structure and method as described above.

As also described above in detail, according to the third aspect of the present invention, when the fastening member for coupling the upper half with the lower half is inserted thereinto, the locking pieces are inserted along the guide ways without rotation, and in particular the locking pawls are preferably inserted into the second and third guide grooves in a secure manner which enables tight fastening of the upper surface of the first coupling boss superposed on the bottom surface of the second coupling boss by the locking pawls. The locking pawl of each locking piece which is fitted into the recess prevents its rotation and hence is not loosened or removed upon carrying the cartridge around or its attachment to or detachment from a recording/reproducing device.

On the other hand, when disassembling a recording media cartridge scraped after use, the fastening member is rotated to move each locking pawl to the position in which the unlocking groove is located so that the thus unlocked upper and lower halves can be readily disassembled. However, since the rotation of the fastening member moves the first guide grooves to the position apart from the guide ways, the fastening member does not detached from the lower half or lost. There is no harm in recycling as new material if the lower half and the fastening member are made of the same plastic material.

As described above, this aspect enables easy disassembly of the recording media cartridge scraped after use and has an effect of providing a fastening structure of a case body which excludes the necessity of re-sorting metal pieces taking into consideration the incorporation of metal pieces even when the case body is disassembled, sorted for every kind of material and recycled for use as new material for every kind of material.

What is claimed is:

1. A recording media cartridge comprising:
   a case body formed from an upper half and a lower half;
   a recording medium which is rotatably accommodated in the case body;
   an upper engagement portion extending from a bottom face portion of the upper half;
   a lower engagement portion arranged in the lower half in correspondence with the upper engagement portion, the lower engagement portion having an engagement hole and a fitting hole, the engagement hole having a larger diameter than the fitting hole,
   wherein the lower engagement portion and the upper engagement portion are engaged with each other whereby the upper half and the lower half are coupled with each other,
   wherein said bottom face portion of the upper half is fitted into the engagement hole and the upper engagement portion is fitted into the fitting hole and locked therein, and
   wherein the upper engagement portion includes an engagement end having a pair of locking members, wherein the locking members are engaged within the fitting hole.

2. A recording media cartridge for accommodating a recording medium in a case body formed by coupling an upper half with a lower half in a capped manner, wherein a combined lock means for the upper and lower halves at least in two directions perpendicular to each other along side walls of the upper and lower halves is provided in a corner portion of the case body.

3. The recording media cartridge according to claim 2, wherein the combined lock means is formed in the corner portion which is a free or open end of the case body.

4. The recording media cartridge according to claim 2, wherein the combined lock means is integrally formed using a slide core when the upper half or the lower half is formed.

5. The recording media cartridge according to claim 2, wherein the combined lock means has a three-dimensional locking function not only in the two directions perpendicular to each other along the side walls of the upper and lower halves but also in a direction which is perpendicular to these two directions and which vertically passes through the upper and lower halves.

6. The recording media cartridge according to claim 2, wherein the combined lock means is divided into two or more portions.

7. A recording media cartridge for rotatably accommodating a recording medium in a case body formed from an upper half and a lower half, wherein the case body has a fastening structure comprising:
   a fastening member including a flange portion on one surface of which an engagement portion to be engaged with a rotary tool is provided and on a lateral surface of which a plurality of first guide grooves are provided, and a plurality of locking pieces which project from a surface opposed to the surface on which the engagement portion is located;
   a first coupling boss provided on one of the upper half and the lower half and including guide ways with which the first guide grooves provided on the lateral surface of the flange portion of the fastening member are engaged so that the fastening member can be guided without rotation, and each of which includes a cutout larger than a thickness of the flange portion of the fastening member and provided at an end to which the fastening member is inserted; and
   a second coupling boss which is provided on another one of the upper half and the lower half and in which release grooves for passing the plurality of locking pieces of the fastening member therethrough are located midway between the respective adjacent guide ways of the first coupling boss.

8. The recording media cartridge according to claim 7, wherein the first coupling boss further includes second guide grooves through which the plurality of locking pieces of the fastening member pass, respectively;
   the second coupling boss further includes third guide grooves through which the plurality of locking pieces of the fastening member pass, respectively, and locking surfaces which are located on an extension of the third guide grooves and are engaged with the locking pawls of the locking pieces of the fastening member to lock the fastening member thereon; and
   the release grooves are located midway between the respective adjacent third guide grooves and unlock the locking pawls.

9. The recording media cartridge according to claim 8, wherein the locking surfaces of the second coupling boss are recesses for locking the locking pawls of the fastening member provided on the extension of the third guide grooves; and
   the release grooves are located midway between the respective adjacent third guide grooves.

10. The recording media cartridge according to claim 8, wherein the plurality of locking pieces are four locking pieces arranged at an interval of 90 degrees;
   the guide ways and the second guide grooves are offset by an angle of 45 degrees; and
   the second guide grooves are aligned with the third guide grooves.

11. The recording media cartridge according to claim 7, wherein the engagement portion which is engaged with the rotary tool is a driver groove.

12. A recording media cartridge comprising:

a case body formed from an upper half and a lower half;

a recording medium which is rotatably accommodated in the case body;

an upper engagement portion arranged in the upper half;

a lower engagement portion arranged in the lower half in correspondence with the upper engagement portion;

a locking member which engages the upper engagement portion with the lower engagement portion;

the upper engagement portion having an engagement hole formed in the upper half in a vertical direction and a fitting hole formed in a bottom surface of the engagement hole; and the lower engagement portion having an insertion hole which is formed in an upper bottom wall and which communicates with the engagement hole, wherein the locking member passes through the engagement hole and the fitting hole of the upper engagement portion and the insertion hole of the lower engagement portion, wherein a tip end locking portion of the locking member is locked on an inner surface of the upper bottom wall of the lower engagement portion, and wherein the lower engagement portion and the upper engagement portion are engaged with each other by the locking member whereby the upper half and the lower half are coupled with each other.

13. A recording media cartridge comprising:

a case body formed from an upper half and a lower half;

a recording medium which is rotatably accommodated in the case body;

an upper engagement portion arranged in the upper half;

a lower engagement portion arranged in the lower half in correspondence with the upper engagement portion;

a locking member which engages the upper engagement portion with the lower engagement portion;

the upper engagement portion having a locking groove formed in the upper half; and the lower engagement portion having a lower locking groove formed in a side wall of the lower half, wherein the locking member has a substantially U-shaped cross section and includes an upper locking pawl portion and a lower locking pawl portion provided at each end of a bridge portion, wherein the upper locking pawl portion of the locking member is engaged with the upper engagement portion and the lower locking pawl portion thereof is engaged with the lower engagement portion, and wherein the lower engagement portion and the upper engagement portion are engaged with each other by the locking member whereby the upper half and the lower half are coupled with each other.

* * * * *